US012237091B2

United States Patent
Conforti et al.

(10) Patent No.: US 12,237,091 B2
(45) Date of Patent: Feb. 25, 2025

(54) CONTINUOUS SEPARATION OF RADIONUCLIDES BY SHOCK ELECTRODIALYSIS

(71) Applicant: Massachusetts Institute of Technology, Cambridge, MA (US)

(72) Inventors: Kameron Conforti, Malden, MA (US); Mohammad Ayman Alkhadra, Cambridge, MA (US); Tao Gao, Cambridge, MA (US); Huanhuan Tian, Cambridge, MA (US); Martin Z. Bazant, Wellesley, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1093 days.

(21) Appl. No.: 17/105,942

(22) Filed: Nov. 27, 2020

(65) Prior Publication Data

US 2021/0158986 A1 May 27, 2021

Related U.S. Application Data

(60) Provisional application No. 62/941,060, filed on Nov. 27, 2019.

(51) Int. Cl.
*G21F 9/06* (2006.01)
*B01D 61/42* (2006.01)
*B01D 61/46* (2006.01)

(52) U.S. Cl.
CPC ........... *G21F 9/06* (2013.01); *B01D 61/4281* (2022.08); *B01D 61/461* (2022.08);
(Continued)

(58) Field of Classification Search
CPC ............... G21F 9/06; B01D 2313/345; B01D 2311/2684; B01D 61/461; B01D 2311/08; B01D 2311/06; B01D 61/4281
See application file for complete search history.

(56) References Cited

U.S. PATENT DOCUMENTS

| 8,801,910 | B2 | 8/2014 | Bazant |
| 8,999,132 | B2 | 4/2015 | Bazant |
| 2011/0308953 | A1* | 12/2011 | Bazant ............... B01D 61/46 204/520 |

FOREIGN PATENT DOCUMENTS

WO    2020142711 A1    7/2020

OTHER PUBLICATIONS

Roddy, J.W. (1984). Evaluation of inorganic sorbent treatment for LWR coolant process streams (ORNL/TM—8729). (Year: 1984).*

(Continued)

*Primary Examiner* — Anthony J Zimmer
*Assistant Examiner* — Eric Scott Sherman
(74) *Attorney, Agent, or Firm* — Modern Times Legal; Robert J. Sayre

(57) ABSTRACT

Radioactive nuclides (radionuclides) are separate from an aqueous radioactive liquid by feeding the liquid into a chamber between a porous anode and a porous cathode of a shock electrodialysis device. Meanwhile, an anolyte is fed through the porous anode, and a catholyte is fed through the porous cathode. A voltage is applied to the porous anode and to the porous cathode to create a voltage differential across the chamber. The liquid is passed through the chamber, and cations are selectively driven from the liquid into the cathode by the voltage differential. The voltage differential creates a desalination shock that produces an ion-enriched zone on one side of the desalination shock and a deionized zone on an opposite side. A brine including the radioactive cations is extracted from the ion-enriched zone through a brine outlet, and fresh water is extracted from the deionized zone through a fresh-water outlet.

17 Claims, 14 Drawing Sheets

(52) U.S. Cl.
CPC ...... *B01D 2311/06* (2013.01); *B01D 2311/08* (2013.01); *B01D 2311/2684* (2013.01); *B01D 2313/345* (2013.01)

(56) References Cited

OTHER PUBLICATIONS

Bryjak, et al. "Capacitive deionization for selective extraction of lithium from aqueous solutions." Journal of Membrane and Separation Technology 4.3 (2015): 110 (Year: 2015).*

Conforti, Kameron Michael. Continuous Ion-Selective Separation by Shock Electrodialysis. 2019. Massachusetts Institute of Technology, Department of Chemical Engineering (Year: 2019).*

Jolley, et al. Low-level radioactive waste from commercial nuclear reactors. vol. 2. Treatment, storage, disposal, and transportation technologies and constraints. No. ORNL/TM-9846-vol. 2. Oak Ridge National Lab.(ORNL), Oak Ridge, TN (United States), 1986. (Year: 1986).*

K. Conforti, "Continuous Ion-Selective Separation by Shock Electrodialysis," Massachusetts Institute of Technology PhD Thesis (2019).

M. Alkhadra, et al., "Continuous Separation of Radionuclides from Contaminated Water by Shock Electrodialysis," 54 Environmental Science & Technology 527-536 (Dec. 2, 2020).

S. Schlumpberger, et al., "Scalable and Continuous Water Deionization by Shock Electrodialys," 2 Environmental Science and Technology Letters 367-372 (2015).

* cited by examiner

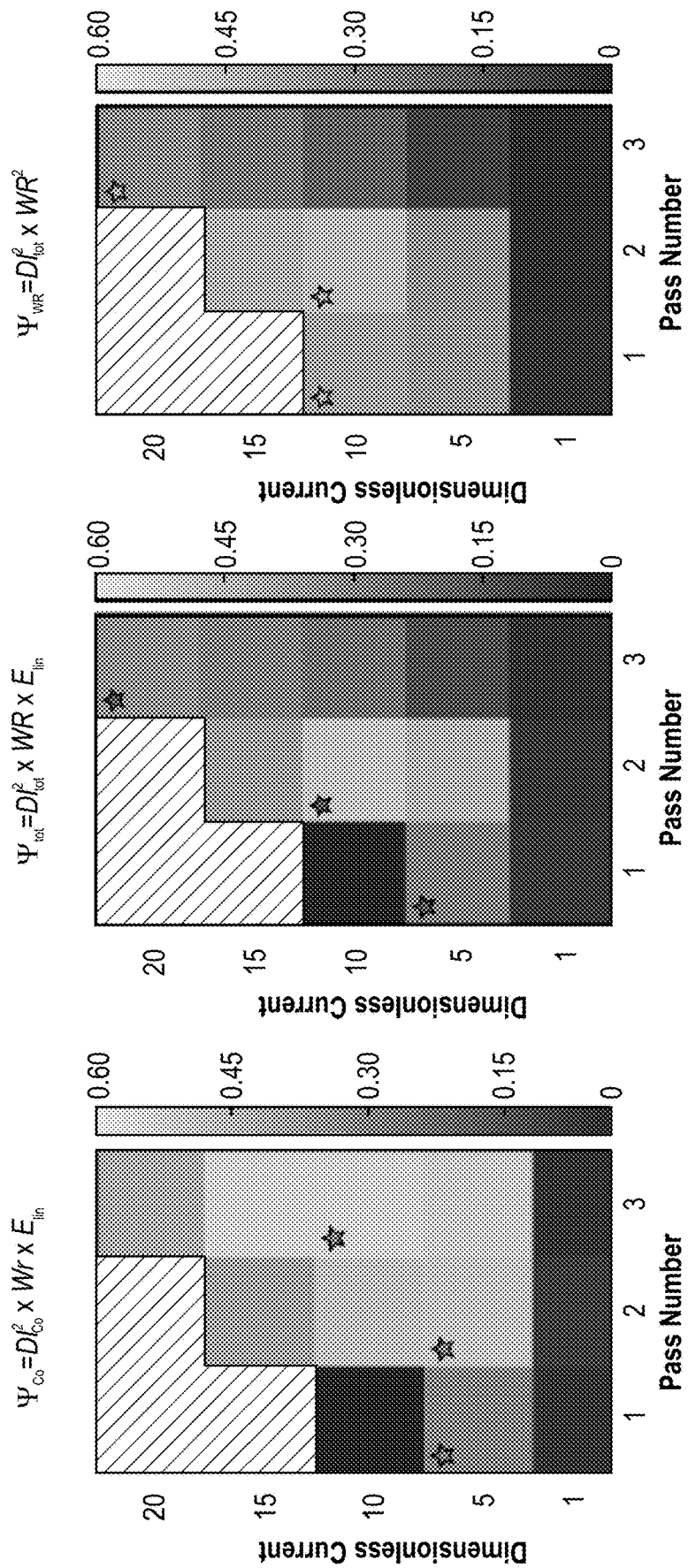

CONTINUOUS SEPARATION OF RADIONUCLIDES BY SHOCK ELECTRODIALYSIS

RELATED APPLICATION

This application claims the benefit of U.S. Provisional Application No. 62/941,060, filed 27 Nov. 2019, the entire content of which is incorporated herein by reference.

BACKGROUND

The discussion of the background state of the art, below, may reflect hindsight gained from the disclosed invention(s); and these characterizations are not necessarily admitted to be prior art.

Nuclear waste is matter that undergoes radioactive decay, a spontaneous process by which an unstable atomic nucleus emits radiation and concomitantly transforms into smaller daughter nuclei. Although radioactive decay is stochastic at the level of individual nuclei, the expected rate of decay for a collection of radioactive nuclides (radionuclides) can be characterized in terms of an observable decay constant such as the half life. Radioactive waste is often a byproduct in the industrial generation of nuclear power and is hazardous to the environment and to nearly all forms of life.

Indeed, high-energy radiation can ionize atoms or even generate free radicals (e.g., hydroxyl from radiolysis of water) that react with the cellular components of an organism, which may cause aberration of chromosomes, mutation of nucleic acids, or death of cells. Given the harmful nature of such radiation, the scientific community has sought to develop methods to isolate, manage, and dispose of nuclear waste.

In treating radioactive water, the goal is often to separate the fluid into two streams. The first of these has low enough activity for safe discharge into the environment, and the second (with the smallest possible volume) is concentrated in radionuclides for further management. Existing methods for treatment can be broadly categorized into physical methods, which focus on extracting uncontaminated water, and chemical methods, which focus on extracting radionuclides. Physical methods include evaporation, reverse osmosis, nanofiltration, ultrafiltration, and microfiltration. In these methods, water is driven across an interface (either a membrane or a gas-liquid interface in the case of evaporation) that retains dissolved species in a concentrated brine. The inclusion of an excess of boric acid (commonly done in the process water of various nuclear reactors for neutron poisoning) complicates the use of several physical methods and makes them more energy intensive. This radioactively inert salt increases the osmotic pressure in membrane technologies, such as reverse osmosis, and is highly corrosive when concentrated. For these reasons, selective removal is preferable to indiscriminately concentrating all dissolved species.

Chemical methods, which are typically (but not always) selective in molecular separations, include solvent extraction (using liquid phase compounds), precipitation, chelation, ion exchange, and electrodeionization (EDI, sometimes called hybrid ion-exchange electrodialysis). These methods target ions based on chemical reactivity (adsorption, chelation, precipitation), solubility and partition coefficient (solvent extraction), affinity for charged or functionalized surfaces (ion exchange, EDI) or response to electric fields in solution (EDI). Apart from shock electrodialysis (SED), EDI is the only technology that involves electrochemistry and is the only chemical method that can operate continuously without the need for additives or solvents. The remaining methods require the use of sacrificial chemicals, such as carriers or additives (adsorption, chelation, precipitation), non-aqueous solvents (solvent extraction), or ion-exchange resins with regenerating acids and salts (ion exchange), the disposal of which has been deemed challenging.

In light-water reactors (LWRs, see FIG. 1 for a simplified schematic), the most common and active byproducts include cobalt-60 and cesium-137. Cobalt-60 is the main contributor to high levels of radiation because it has a short half life (5.3 years) and emits high energy gamma rays (1.17 and 1.33 MeV). Cesium-137, on the other hand, has a longer half life (30 years) and is not as active as cobalt-60, but it is one of most abundant radionuclides produced from fission of uranium-235. Moreover, this species poses long-term risks because, like cobalt-60, it produces high-energy beta particles and gamma rays. Cesium, in general, is an alkaline metal that becomes a monovalent ion in solution and is chemically similar to sodium and potassium.

Radioactive cesium is therefore readily taken up by biological organisms, in which it can deposit on soft tissue and, over time, induce thyroid cancer. Compared to other radionuclides, cesium-137 has been deemed difficult to remove because of its small radius of hydration and high (mass) diffusivity.

SUMMARY

A system and methods for separating radionuclides are described herein, where various embodiments of the system and methods may include some or all of the elements, features and steps described below.

A system for separating radioactive nuclides (radionuclides) includes a source of an aqueous radioactive liquid including radioactive nuclides, a feed conduit for liquid flow from the source of aqueous radioactive liquid, and a shock electrodialysis device (SED) configured to receive the aqueous radioactive liquid from the feed conduit. The SED includes a chamber that includes respective inlets for the aqueous radioactive liquid, wherein the inlet for the radioactive liquid is in fluid communication with the feed conduit from the source; an anolyte; and a catholyte; as well as respective outlets for fresh water, a brine that includes the radioactive nuclides, the anolyte, and the catholyte. A porous anode is contained in the chamber and is configured for flow of the anolyte therethrough. A porous cathode is contained in the chamber and is configured for flow of the catholyte therethrough. At least two of the following function as ion separators: an ion-selective boundary (e.g., two ion-selective boundaries), the anode (configured for ion separation); and the cathode (configured for ion separation). The ion separators are configured to selectively pass at least some cations, wherein a channel for flow of the aqueous radioactive liquid from the feed conduit is defined between the ion separators. Moreover, the anode and the cathode are configured to drive ionic current in the aqueous radioactive liquid across the channel when the aqueous radioactive liquid fills the channel, and the ion separator is configured to conduct the ionic current. A cationic porous medium is positioned between the ion-selective boundaries in the channel and has a positive surface charge to promote flow of the ionic current across the channel and the production of a desalination shock. The desalination shock produces a region of fresh water on one side of the desalination shock and a brine that includes the radioactive nuclides from the aqueous radioactive liquid on an opposite side of the desalination shock.

A method for separating radioactive nuclides includes feeding an aqueous radioactive liquid including radioactive nuclides into a chamber between a porous anode and a porous cathode of a shock electrodialysis device, feeding an anolyte through the porous anode, and feeding a catholyte through the porous cathode. A voltage is applied to the porous anode and to the porous cathode to create a voltage differential across the chamber. The aqueous radioactive liquid is passed through the chamber, and cations are selectively driven from the aqueous radioactive liquid into the porous cathode via the creation of the voltage differential. A desalination shock is created in the aqueous radioactive liquid via the creation of the voltage differential, and the desalination shock produces an ion-enriched zone on one side of the desalination shock and a deionized zone on an opposite side of the desalination shock. A brine including the radioactive cations is extracted from the ion-enriched zone through a brine outlet, and fresh water is extracted from the deionized zone through a fresh-water outlet.

The increasing popularity of nuclear energy necessitates development of new methods to treat water that becomes contaminated with radioactive substances. Because this polluted water comprises several dissolved species (not all of which are radioactive), selective accumulation of the radionuclides is desirable to minimize the volume of nuclear waste and to facilitate its containment or disposal. In this article, we use shock electrodialysis to selectively, continuously, and efficiently remove cobalt and cesium from a feed of dissolved lithium, cobalt, cesium, and boric acid. This formulation models the contaminated water commonly found in light-water reactors and in other nuclear processes. In a three-pass process, a consistent trade-off is observed between the recovery of decontaminated water and the percentage of cobalt removed, which offers flexibility in operating the system. For example, 99.5% of cobalt can be removed with a water recovery of 43%, but up to 66% of the water can be recovered if deionization of cobalt is allowed to drop to 98.3%. In general, the energy consumed during this process (ranging between 1.76 and 4.8 kWhm$^{-3}$) is low because only charged species are targeted and virtually no energy is expended removing boric acid, the most abundant species in solution.

Herein, we adapt an emerging electrokinetic deionization method known as shock electrodialysis (SED) to continuously treat water contaminated with radioactive ions. This study focuses on the basic physics and design principles needed to selectively remove cobalt ($^{59}$Co) and cesium ($^{133}$Cs), while recovering a reasonable fraction of the water fed and minimizing the energy cost of the process. Since SED is an electrokinetic method, separation of ions is based primarily on charge and is insensitive to mass, which implies that our results should also be applicable to radioactive isotopes of cobalt and cesium. The principal aim of our methodology is to concentrate nuclear waste in a contained discharge stream and, in turn, minimize the volume of waste that would need management, recycling, or disposal in subsequent processes.

Our strategy for separation is based on the phenomenon of deionization shock waves by which a sharp gradient in the concentration of salt propagates near an ion-selective boundary, such as a cation exchange membrane or a metal electrodeposit. A suitable electrodeposition process for forming the metal electrodeposit can involve use of an inexpensive, sacrificial electrode, such as copper or aluminum, that would be plated by transition metals under an applied voltage. This ion-selective surface deposition can serve to transport current through the system and is ion-selective in the same way that ion-exchange membranes are because, presumably, only the cations would be deposited on the electrode.

Moreover, our system comprises a weakly charged porous medium to sustain overlimiting current—at which transport of ions is faster than by diffusion alone—as the conductivity of the solution diminishes near this surface. The shock wave splits the system into a region that is concentrated and another that is deionized. These regions are then continuously separated by driving flow perpendicular to the applied electric field. This system can therefore achieve electrically tunable and "membrane-less" separation within the porous material without any physical barriers in the direction of flow. In contrast to conventional electrodialysis in which overlimiting current is often sustained by chemical or hydrodynamic instabilities, overlimiting current in SED is sustained by electrokinetic phenomena at the scale of pores, namely surface conduction and electroosmosis. Experimentally, concentration polarization was first observed in glass microchannels emanating from nanoscopic junctions or membranes. SED, however, relies on the propagation of macroscopic shock waves across a network of charged pores, which is necessary for flow-fractionation, scale-up to practical flow rates, and improvement of both desalination and water recovery by leveraging electroosmotic flow.

BRIEF DESCRIPTION OF THE DRAWINGS

FIG. 10 plots water recovery as a function of dimensionless current; graduated cylinders portray relative proportions of the fresh and brine products, where each data point represents the arithmetic mean of four samples with the shaded area corresponding to the range of those samples. FIG. 11 plots power and cost rate (power multiplied by residential cost of electricity) as functions of dimensionless current. FIG. 12 plots energy density and cost density (energy density multiplied by residential cost of electricity) as functions of dimensionless current.

FIG. 13 provides a two-dimensional array of deionization as a function of dimensionless current in each pass. FIG. 14 plots deionization per pass (bottom) and cumulative deionization (top) for each species with a dimensionless current of 5.

FIG. 15 provides a two-dimensional arrays of total deionization (top) for the three target species, water recovery (middle), and energy density (bottom) as functions of dimensionless current in each pass.

FIGS. 16-18 provide a quantitative characterization of the performance of the 3-step process shown in FIGS. 13-15. Figure of merit, $\psi$, (as defined in Eq. 9) based on deionization of cobalt only (DICo) (FIG. 16), total deionization ($DI_{tot}$) (FIG. 17), and water recovery (WR) (FIG. 18), weighted quadratically and with no penalty on energy demand, as functions of dimensionless current in each pass.

Figure 1:
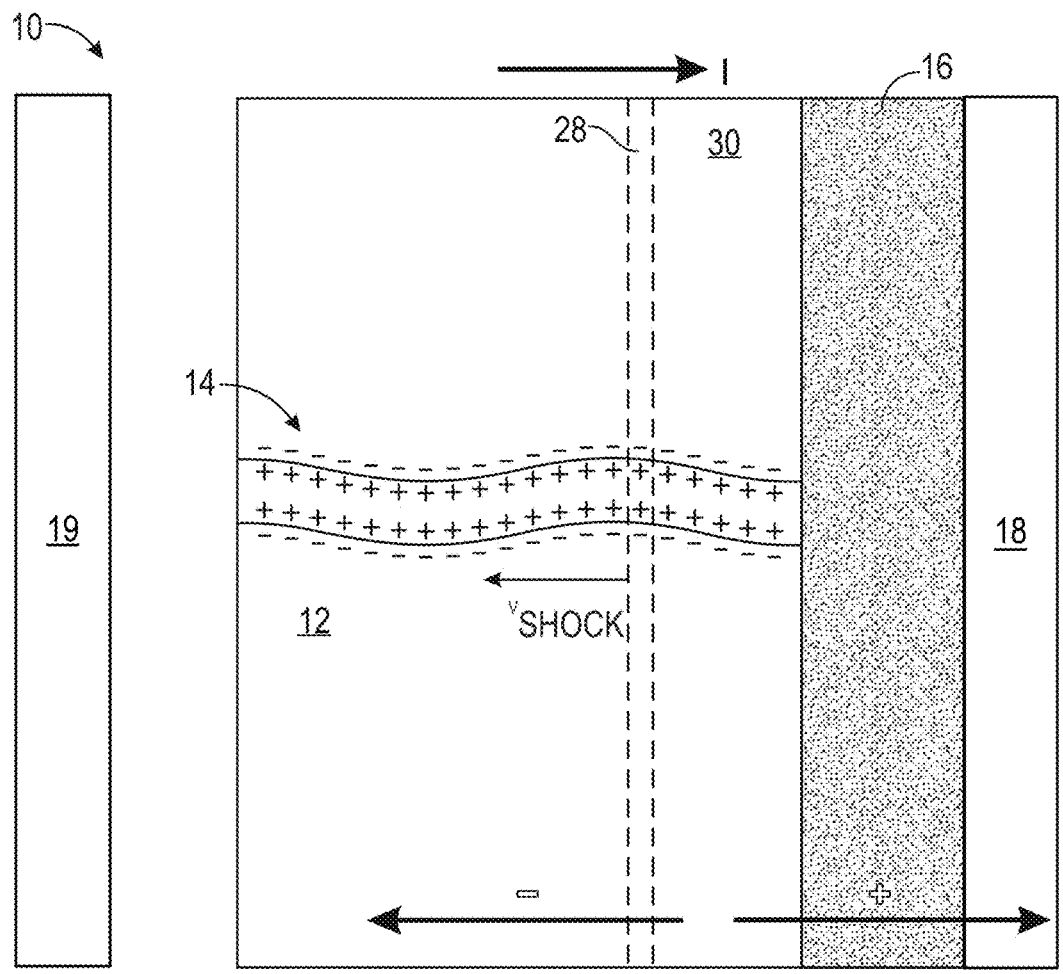
FIG. 1 shows the basic elements of a desalination and purification system, including a cationic porous medium (CPM) with negatively charged pores in contact with a cation exchange membrane (CEM).

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., –20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Shock Electrodialysis (SED):

A desalination and purification system 10 is shown in FIG. 1. A cationic porous medium (CPM) 12 with negatively charged pore channels 14 is in contact with a cation exchange membrane (CEM) 16. A liquid including co-ions and oppositely charged counter-ions, charged impurities and/or charged droplets flows left-to-right as shown through the cationic porous medium 12. Direct electric current is passed from the cationic porous medium 12 through the cation exchange membrane 16, and a desalination shock forms at the CPM/CEM interface and propagates into the cationic porous medium 12, leaving behind a depleted region of fresh water (the term, "fresh water," as used herein, can represent potable water having less than approximately 10 mM of dissolved salts). Particles suspended in the input stream are also rejected by size or charge at the entrance to the cationic porous medium (at the left side of the cationic porous medium 12 in FIG. 1) and are further rejected by the shock within the cationic porous medium 12. The direction of flow for anions and cations in the system are shown with respective arrows. Though a gap for liquid flow is shown here between the anode 19 and the cationic porous medium 12, the anode 19 and cationic porous medium 12 can be in flush contact in other embodiments, and the source liquid can be directly injected into the porous medium 12.

The porous medium 12 has a rigid structure and has ideally a high surface charge. In one embodiment, the cationic porous medium 12 is a porous glass frit with approximately 1-micron pores, and the cation exchange membrane 16 is formed of a sulfonated-tetrafluoroethylene-based fluoropolymer-copolymer (commercially available as a NAFION membrane from E. I. du Pont de Nemours and Company), which is assembled together with a porous cathode 18.

Figure 2:
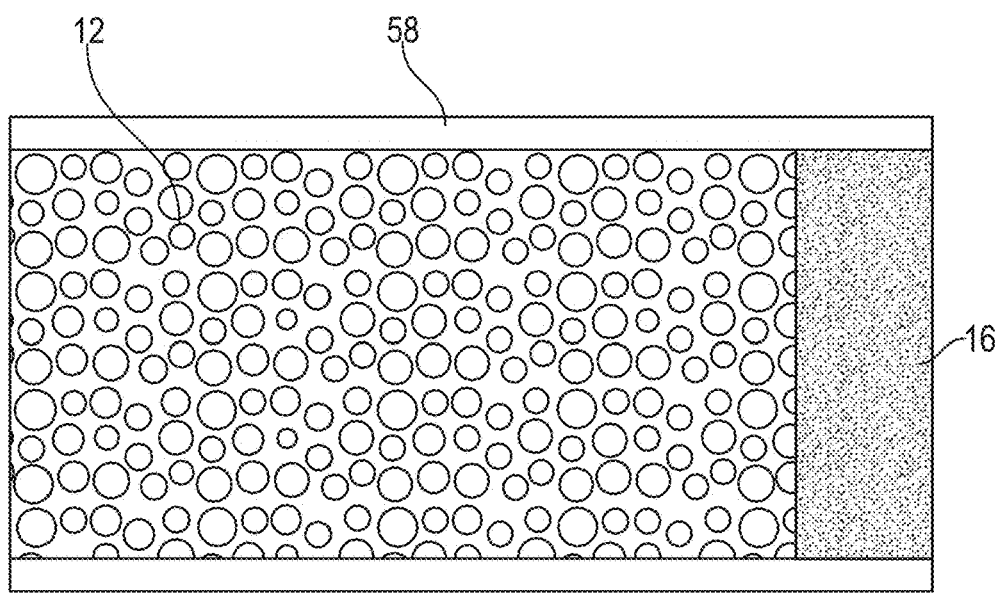
FIG. 2 shows another embodiment of the system of FIG. 1, where the cationic porous medium is a packed bed of micron-sized negatively charged beads (e.g., silica or latex) in a liquid-filled tube or column.

In the embodiment of FIG. 2, the cationic porous medium 12 is a packed bed of microspheres formed, e.g., of silica or latex. In particular exemplifications, the cationic porous medium 12 can be porous glass frit with a median pore size of 1 µm.

Figure 3:
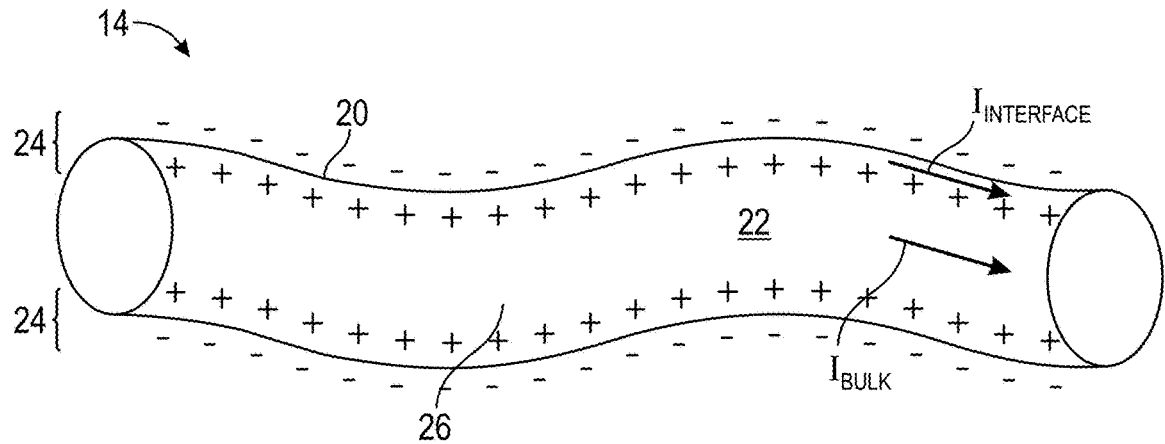
FIGS. 3 and 4 are illustrations intended to explain the basic physics of desalination shock formation in a charged pore filled with a liquid electrolyte.

As shown in FIG. 3, the pore walls 20 of the cationic porous medium 12 have a negative charge and attract excess positive ions from the liquid to form double layers 24 at the interfaces of the pore walls 20 and the liquid 22. Typically, the double layers 24 are thin compared to the channel thickness. The pore channels have a sufficient diameter, $h_p$ (e.g., at least 50 nm in water, or more generally, greater than the Debye length), to prevent overlap of double layers on opposite sides of the pore channel. The liquid volume 26 bounded by the double layers 24 is termed the "bulk liquid."

Figure 4:
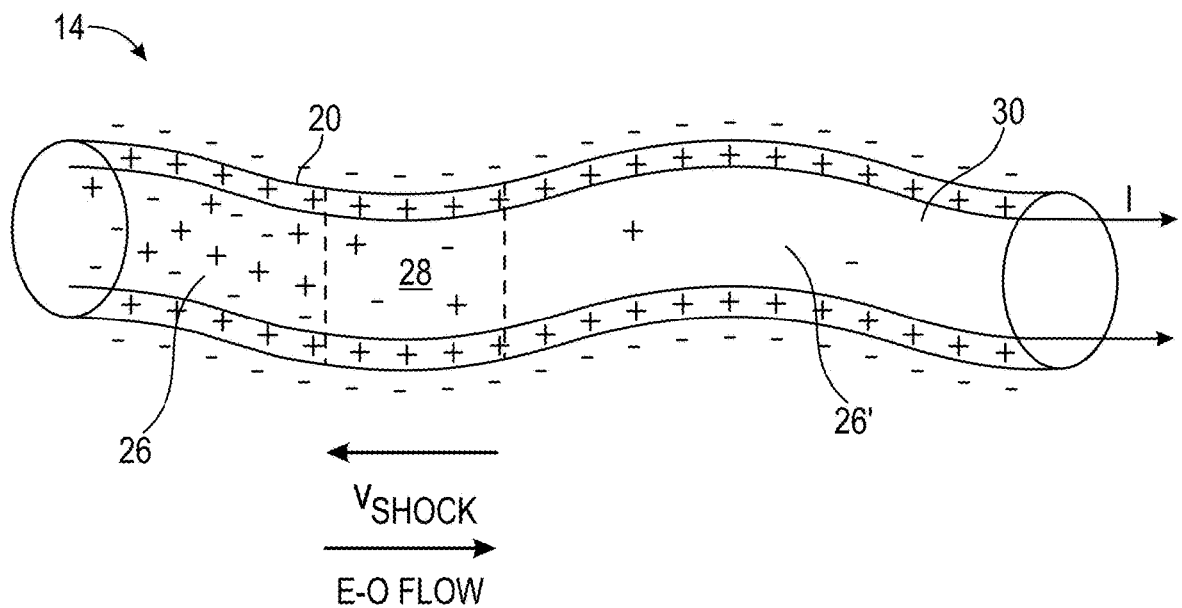

The pore channel 14 can be conceptually divided into three regions, as shown in FIG. 4. The liquid in the bulk volume 26 has a high charge content, or ionic conductivity, on the left side (as shown) where the initial liquid is introduced; as a result, electric current flows primarily through the bulk liquid here. In the center is a "shock region" 28 in which current flows shifts from being primarily in the bulk liquid volume 26 (on the left side) to being primarily in the double layer 24 (to the right). The bulk liquid volume 26' in the region 30 to the right of the shock region 28 is depleted (i.e., has a very low content of charged ions, particles or droplets); consequently, the electrical resistance in the bulk liquid volume 26' in the depleted region 30 is lower than the electrical resistance along the double-layer interface 24. Accordingly, this depleted bulk liquid volume 26' can be regarded as being desalinated and/or purified compared with the initial liquid fed into the system 10. The fundamental mechanism for the formation of the depleted region 30 is surface conduction through the double layers 24, which becomes increasingly important compared to classical diffusion in the bulk liquid 26/26', as the salt concentration is reduced by the ion-selective surface (of the membrane 16 or electrode 18).

In contrast to electrodialysis, these porous media are used to produce desalination shocks that drive localized "membrane-less" desalination and purification processes within the porous media.

In addition to the above discussion of shock electrodialysis, this disclosure utilizes and incorporates by reference the teachings of U.S. Pat. Nos. 8,801,910 B2 and 8,999,132 B2, and K. Conforti, "Continuous Ion-Selective Separation by Shock Electrodialysis," Massachusetts Institute of Technology PhD Thesis (2019) and describes various advances from these disclosures, including but not limited to using a multi-pass/stage approach with different parameters for each pass/stage of ion separation and managing the chemistry of the streams in the ion-separation process.

Figure 5:
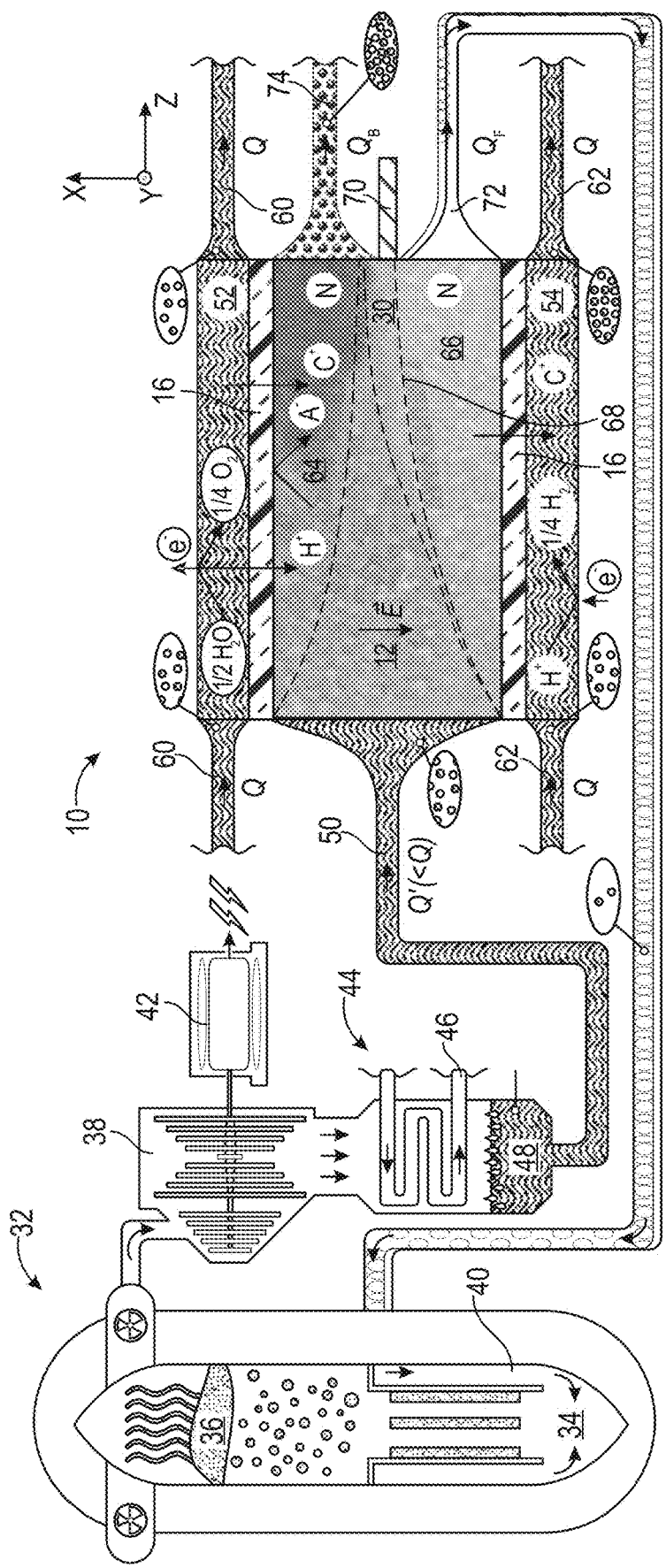
FIG. 5 illustrates the operating principles of a light-water nuclear reactor and the SED device used for decontamination.

The operating principles of a light-water nuclear reactor 32 and an SED device 10 used for decontamination are shown in FIG. 5. At left is a simplified schematic of a boiling water reactor 32 (i.e., a type of light-water reactor) used to generate electrical power by heating water 34 (in the reactor core 40) that turns into steam 36 and drives a turbine 38 that drives a generator 42. Several radionuclides are present in this water 34 and contaminate the reactor components outside the core 40. The nuclear reactor 32 accordingly serves as a source of an aqueous radioactive liquid including radioactive nuclides (radionuclides).

After the steam 36 from the reactor 32 passes through the turbine 38, the steam 36 is condensed by a condenser 44 through which cooling water 46 is passed. The condensate 48 (including boric acid, lithium, cobalt, and cesium) formed in the condenser 44 is passed as contaminated water 50 (interchangeably also referred to herein as "practical water" or "radioactive water") through a feed conduit and an inlet to the shock electrodialysis (SED) device 10.

Figure 19:
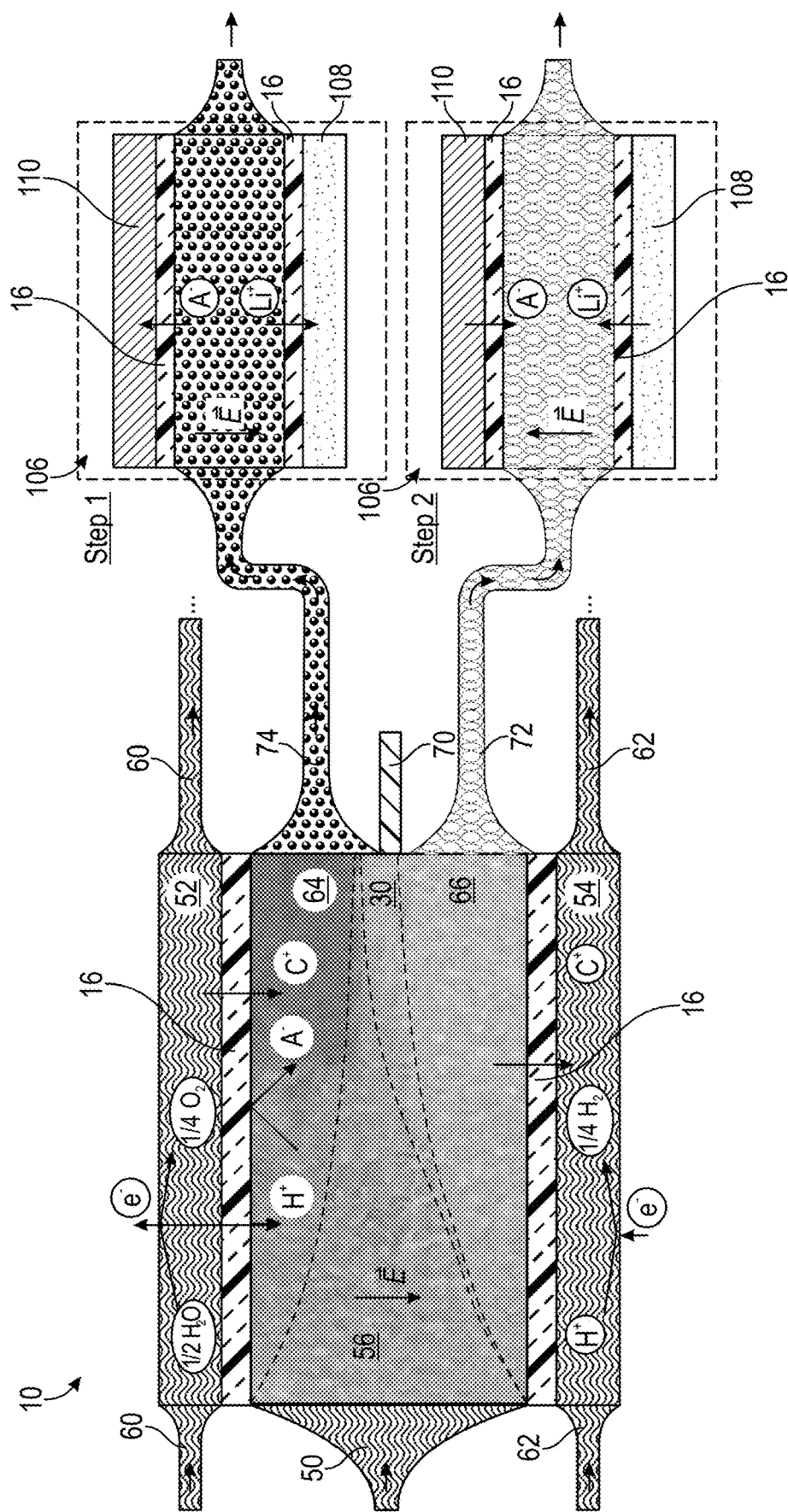
FIG. 19 illustrates process intensification of SED by using CDI to recycle $Li^+$ in two steps. The first step involves selective capture of $Li^+$ in the CDI unit from the brine stream discharged by SED. Selectivity is achieved by intercalation of $Li^+$ into an iron phosphate electrode, which becomes lithium iron phosphate ($Li_xFePO_4$) upon insertion of $Li^+$. The second step involves release of $Li^+$ into the fresh stream exiting the SED device by reversing the direction of electric field.

At right, a rectangular cross section of the SED device 10 shows water splitting ($H_2O \rightarrow \frac{1}{2}H_2O + H^+ + \frac{1}{4}O_2$) at the anode 52 and formation of molecular hydrogen ($H_2$) at the cathode 54, which is maintained under acidic conditions to prevent precipitation of metal hydroxides, which are the primary electrochemical reactions that provide electrical current to the cell. As shown in FIGS. 5 and 19, contaminated water in the porous frit 56 is then subjected to an electric field ($\vec{E}$) that transports charged species (labeled $C^+$ for cations and $A^-$ for anions) perpendicular to the flow. Anions are blocked by cation exchange membranes 16 (CEMs), and neutral species (labeled N) are unaffected by the electric field ($\vec{E}$). Here, flow rate is denoted by the letter, Q; and streams are shaded based on the relative concentration of ions. Also shown is an ion-enriched zone 64, a depletion zone 30, a deionized zone 66, and a shock wave front 68. The radionuclides may pass through the cation exchange membranes 16 (from the fresh water 72 to the catholyte 62 and from the anolyte 60 to the brine 74, all vertically); but, in practice, the electrode streams 60 and 62 can be continuously recycled so that, at steady state, radionuclides will be discharged from the system 10 through the brine stream 74.

An anolyte 60 is fed from an inlet to the SED through the porous anode 52 on one side of the SED device 10, while a catholyte 62 is fed from another inlet to the SED through the porous cathode 54 on an opposite side of the SED device 10. A splitter 70 divides the output from the porous frit 56 into fresh water 72 exiting from the deionized zone 66 on one side and brine 74 on an opposite side of the splitter 70 from the ion-enriched zone 64. The fresh water 72 is recirculated via a conduit to the reactor 32.

The first laboratory scale prototype to successfully demonstrate SED was designed, built, tested, and patented by our group. To achieve continuous operation, subsequent iterations of this system introduced a novel cross-flow architecture, in which the feed flows through a porous glass frit 12 in a channel placed between identical cation exchange membranes 16, as shown in FIG. 5. In other embodiments, where the anode 52 and cathode 54 perform the ion-separation function without need for membranes, the frit 12 can be placed between the anode 52 and cathode 54. The frit 12 was made of sintered borosilicate glass, a porous material with negative charges bound to the surfaces of its pores, which were nominally 1 micron in size.

By placing a splitter 70 downstream of the frit 12, the exiting fluid was separated into an enriched (brine) stream 74 and a deionized (fresh water) stream 72 exiting through respective outlets from the anodic (represented by anode 52) and cathodic (represented by cathode 54) sides of the shock wave, respectively. Previous work showed that SED can continuously deionize electrolytes comprising monovalent cations (represented as $C^+$), including those from NaCl, KCl, KNOB, and $Na_2SO_4$. These measurements were made by quantifying changes in electrical conductivity of the solution. This work also revealed that water recovery (defined as the fraction of fluid recovered as desalinated water from the concentrated feed) can be increased to over 80% by increasing the applied current and without repositioning the splitter 70. Improved water recovery was attributed to electroosmotic flow perpendicular to the imposed flow, which conveniently delivered more fluid to the depleted (deionized) region 66.

Because many radionuclides and harmful products of corrosion are dissolved in water as multivalent ions, these SED methods can be used to purify water contaminated with radioactive ions and byproducts of various nuclear processes.

The concentrations of prevalent species in practical water, the non-radioactive analog of contaminated process water in nuclear reactors, are provided in Table 1, below.

TABLE 1

| Species | Concentration (ppm[mM]) | Role |
| --- | --- | --- |
| boron | 4.000 [370] | present in boric acid; boron-10 serves as neutron poison |
| lithium-7 | 2.2 [0.32] | used (as LiOH) to stabilize pH and control corrosion |
| cobalt-59 | 20 [0.34] | cobalt-60 is the main contributor to high levels of radiation |
| cesium-133 | 100 [0.75] | cesium-137 is one of the most abundant fission byproducts |

In this study, we prepared model radioactive water (referred to hereafter as "practical water") with the composition outlined in Table 1. This solution includes non-radioactive isotopes of the ions most abundant and active in the process water of light water reactors (LWRs), namely cobalt and cesium. Boric acid is included abundantly as it is often used as neutron poison in these reactors because boron-10 can reduce the likelihood of thermal fission by absorbing neutrons. Lastly, lithium-7 is used (in the form of LiOH) as an additive to control water chemistry and minimize the corrosive effects of boric acid. During operation, small amounts of hazardous corrosion and fission byproducts (e.g., cobalt and cesium) are released into the process water, such that non-radioactive species may undergo radioactivation near the hot reactor core. For example, cobalt-60 is produced when its precursor, cobalt-59, is bombarded with thermal neutrons; cobalt-59 is the naturally occurring isotope of cobalt with 100% abundance, and it is used in alloys that are required to possess thermal and mechanical resilience. These species are then able to settle onto surfaces of the cooling system and recirculation pipes, and the quantity of undesired deposits of radionuclides increases with time. Accumulation of radioactive matter in the structural portions of nuclear reactors is thus an occupational hazard to those who work in the vicinity of these systems and are exposed to such radiation. We note, however, that demineralization of process water in LWRs is just one possible application of SED, and the study of selective removal of cobalt and cesium is generally relevant to treatment of nuclear (waste) water.

Figure 6:
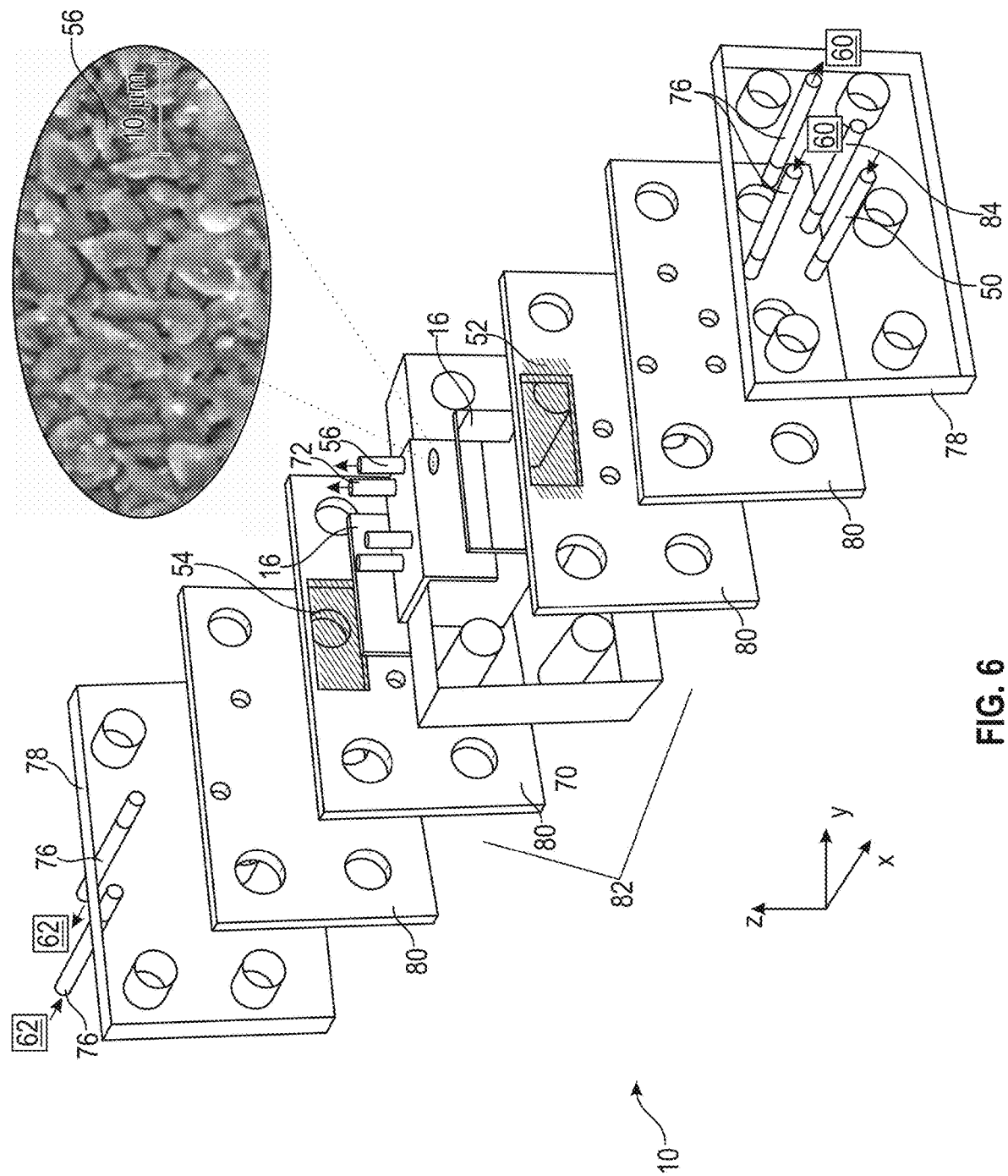
FIG. 6 is an exploded 3D view showing the assembly of a shock electrodialysis (SED) device.

This continuous, laboratory scale architecture of an SED device 10 is illustrated in an exploded view in FIG. 6. Also included in FIG. 6 is a close-up image of the glass frit 56 taken by scanning electron microscopy.

This exemplification of the device included three inlets, two to respectively transport an anolyte 60 and a catholyte 62 to the anode 52 and the cathode 54 (to which voltages are applied) and a third to deliver contaminated feed 50, as well as four outlets—two to transport fluid 60 and 62 from the electrodes 52 and 54 and the other two to generate freshwater 72 and brine 74 streams at the splitter 70, as shown in FIG. 5. All fluids were transported through $\frac{1}{8}^{th}$-inch TYGON tubing 76 (from Saint-Gobain) glued onto portplates 78 made of cast acrylic. These portplates 78 were used to seal liquids inside the device and to support the rubber tubing 76 in which fluid flows. Moreover, four $\frac{1}{16}^{th}$-inch VITON rubber gaskets 80 (DuPont) were used to conformally seal the device and simultaneously provide channels for the electrode solutions (catholyte and anolyte).

The electrodes 52 and 54 in this device were platinum meshes (Sigma-Aldrich) that were connected to a REFERENCE 3000 potentiostat/galvanostat (from Gamry Instruments) using titanium wires 82 (from Alfa Aesar). The electrodes 52 and 54 and wires were secured in place by compressible VITON gaskets 80.

Cation exchange membranes 16 [sulfonated-tetrafluoroethylene-based fluoropolymer-copolymer (NAFION N115) membranes from Ion Power, Inc.] that permit passage only of cations and that have a thickness of approximately 130 µm served as fluidic barriers between the electrode channels and the porous medium 56, which in this study was a microporous borosilicate frit (from Adams & Chittenden Scientific Glass) with ultrafine pores (nominally ranging from 0.9 to 1.4 µm in size), an internal surface area of 1.75 $m^2 g^{-1}$ based on Brunauer-Emmett-Teller (BET) theory, a mass density of 1.02 $gm^{-3}$, a porosity of 0.31, and dimensions of 20 mm×10 mm×9 mm. Prior to assembly, the frit 56 was glued onto an acrylic frame using DEVCON 2-Ton Epoxy (from McMaster-Carr). The splitter 70 (placed midway down the frit for ease of assembly) was made of cast acrylic and was sealed against the top face of the frit 56 using 0.04-inch GORE expanded polytetrafluoroethylene (ePTFE) gasket tape. Holes in all of the acrylic portplate slabs 78 and rubber gaskets 80 were formed using a laser cutter (from Universal Laser Systems) and refined with a drill press (a Palmgren 10-inch, 5-speed bench model). These layers 70, 16, 80, and 78 were then stacked and held together with nuts, bolts, and washers made of 316 stainless steel.

To prepare practical water with the composition shown in Table 1, we formulated stock solutions with 1,000 times the target concentrations made from lithium hydroxide monohydrate ($LiOH*H_2O$), cobalt (II) chloride hexahydrate ($CoCl_2*6H_2O$), and cesium chloride (CsCl). Appropriate volumes of these solutions were then diluted in deionized water, followed by the addition of solid boric acid ($H_3BO_3$) to achieve a concentration of 370 mM. All reagents were purchased from Sigma-Aldrich and used as received. We note that $H_3BO_3$ is a weak acid with a first pKa of 9.24 in pure water at room temperature, with the following equation for dissociation equilibrium:

$$H_3BO_3 \rightleftharpoons H^+ + H_2BO_3^- \qquad (1)$$

we determined the concentration of $H_2BO_3^-$ to be approximately 0.015 mM in solution. This weak dissociation implied that virtually all of the boron was present as electrically neutral boric acid and thus was not separated by SED. We recognized, however, that $H_3BO_3$ could have influenced the pH of practical water, the dynamics of proton transport, and the extent of ionic separation.

The pH of practical water (assumed here to be an ideal solution) was indeed calculated assuming partial dissociation of $H_3BO_3$ as well as complete dissociation of LiOH. By definition of the equilibrium constant, $K_a$, we obtained the following:

$$\frac{[H^+][H_2BO^-_3]}{[H_3BO_3]} = K_a = 10^{-pKa} \Rightarrow \quad (2)$$

$$\frac{[H^+]([LiOH]_0 + [H^+])}{[H_3BO_3]_0 - [LiOH]_0 - [H^+]} = 10 - pK_a,$$

where brackets denote concentration (molarity), $[H_3BO_3]_0$=0.37 M, $[LiOH]_0$=0.32 mM, and pKa=9.24. Solving this algebraic equation gave the following:

$$[H^+]=6.6\times10^{-7}\ M \Rightarrow pH=-\log([H^+])=6.2. \quad (3)$$

In preparing practical water, the anolyte 60 and contaminated feed 50 were identical in composition, whereas the catholyte 62 included an additional dose of hydrochloric acid (HCl) with a concentration of 10 mM. This dose of HCl was deliberately added to prevent precipitation of cobalt hydroxide that could have formed as a result of hydrogen evolution in the otherwise basic catholyte.

With these solutions prepared, experiments began by setting the flow rates of all streams. All flow rates were held constant: 0.21±0.01 mLmin$^{-1}$ for the electrode streams (anolyte 60 and catholyte 62) and 0.065±0.003 mLmin$^{-1}$ for the contaminated feed 50. To transport these streams to the SED device 10, we used peristaltic pumps equipped with TYGON chemical tubing 76 (from Saint-Gobain). With such pumps and at low speeds of rotation, the flow would be pulsed, though it was made smooth by incorporating a small buffering tank 84, known commonly as a hydraulic accumulator (or capacitor), just upstream of the device. In this exemplification of the design, the accumulators 84 were capped glass vials that held a small volume of (compressible) air above the (incompressible) liquids being pumped at the bottom to smooth out pulsations. With flow rates set and tubing connected, the accumulators 84 were left to pressurize and the system to equilibrate overnight, after which the potentiostat/galvanostat was set to operate in galvanostatic mode. Air inside the accumulators 84 became pressurized over time until the fluidic resistance downstream, such as that created by the porous frit, was overcome by the pumped liquid. The measured voltage was allowed to stabilize for at least one hour until it reached steady state.

Samples were collected directly from the device in graduated cylinders and stored in conical centrifuge tubes for analysis, which included measurement of volume, conductivity, pH, and composition of cations. Conductivity and pH were measured using a SEVENCOMPACT pH/fond S213 meter (from Mettler Toledo analytical instruments), and composition was determined using inductively coupled plasma mass spectrometry using an AGILENT 7900 ICP-MS mass spectrometer. The plasma in the inductively coupled plasma mass spectrometry (ICP-MS) was made from argon gas and was supplemented by helium, which is normally needed to analyze elements with high ionization energies (e.g., Co) for which argon plasma alone is not a sufficient source of ionization. To improve the accuracy of our data and subsequent analysis, we incorporated an internal standard that introduced 100 ppb of indium to all of our samples. Since the output of ICP-MS was numerical (in counts per second), quantitative analysis involved calibration of the measurements, which was achieved by processing a set of reference standards and producing a calibration curve. These standards (for Li, Co, Cs, and In) were purchased from Sigma-Aldrich and serially diluted to prepare a set of samples encompassing the concentrations relevant to this study. All samples and standard solutions were diluted in 2 vol % nitric acid prior to analysis by ICP-MS.

Figure 7:
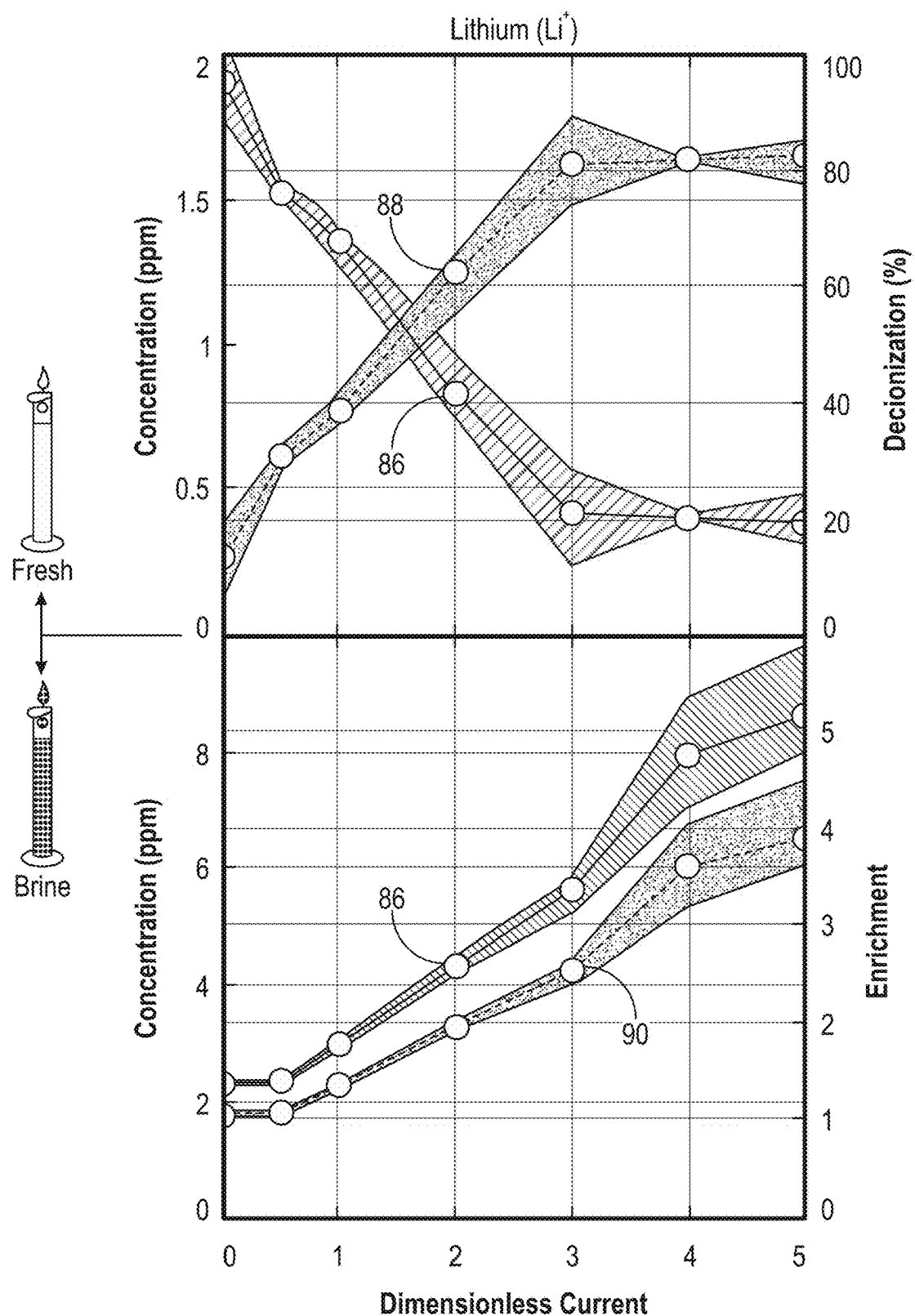
FIGS. 7-9 plot the quantitative analysis of the deionization of lithium (Li$^+$) (FIG. 7), cobalt (Co$^{2+}$) (FIG. 8), and cesium (Cs$^+$) (FIG. 9) in practical water. The upper (lower) half of each panel shows measured concentration and calculated deionization (enrichment) in the fresh (brine) stream as functions of dimensionless current.

A quantitative analysis of the deionization of (a) lithium, (b) cobalt, and (c) cesium in practical water is provided in FIG. 7. The upper (lower) half of each panel shows measured concentration 86 and calculated deionization 88 (enrichment 90) in the fresh (brine) stream as functions of dimensionless current. The concentration of ions in the feed was 1.41 mM, with compositions outlined in Table 1. Each data point represents the arithmetic mean of four samples, and the shaded areas correspond to the range of those samples.

The key phenomenon that governs deionization in SED is propagation of a shock wave across which concentration varies drastically and a depletion zone is formed. This shock is generated by providing the system with an overlimiting current, which is current in excess of the flow-limited current (him) defined as follows:

$$I_{lim} = \sum_k v_k C_k F Q', \quad (4)$$

where v is valence (charge), Cis molar concentration, F is Faraday's constant, Q' is the volumetric flow rate of the feed, and the sum is taken over all cations, k. This definition of $I_{lim}$ can be interpreted as the rate of forced convection of positive charge carriers into the device, and it was assumed that the flux of anions is 0 at steady state in the presence of ideal cation exchange membranes. Using the composition of practical water in Table 1 and with Q'=0.065 mLmin$^{-1}$, we found that $I_{lim}$=180 µA. We verified this value experimentally by performing a conventional voltage sweep from 0 to 10 V and measuring the current. After exceeding $I_{lim}$, the (overlimiting) current increased linearly with voltage and effected constant conductance, which was consistent with the governing theory as well as previous experimental observations in negatively charged porous media.

Figure 8:
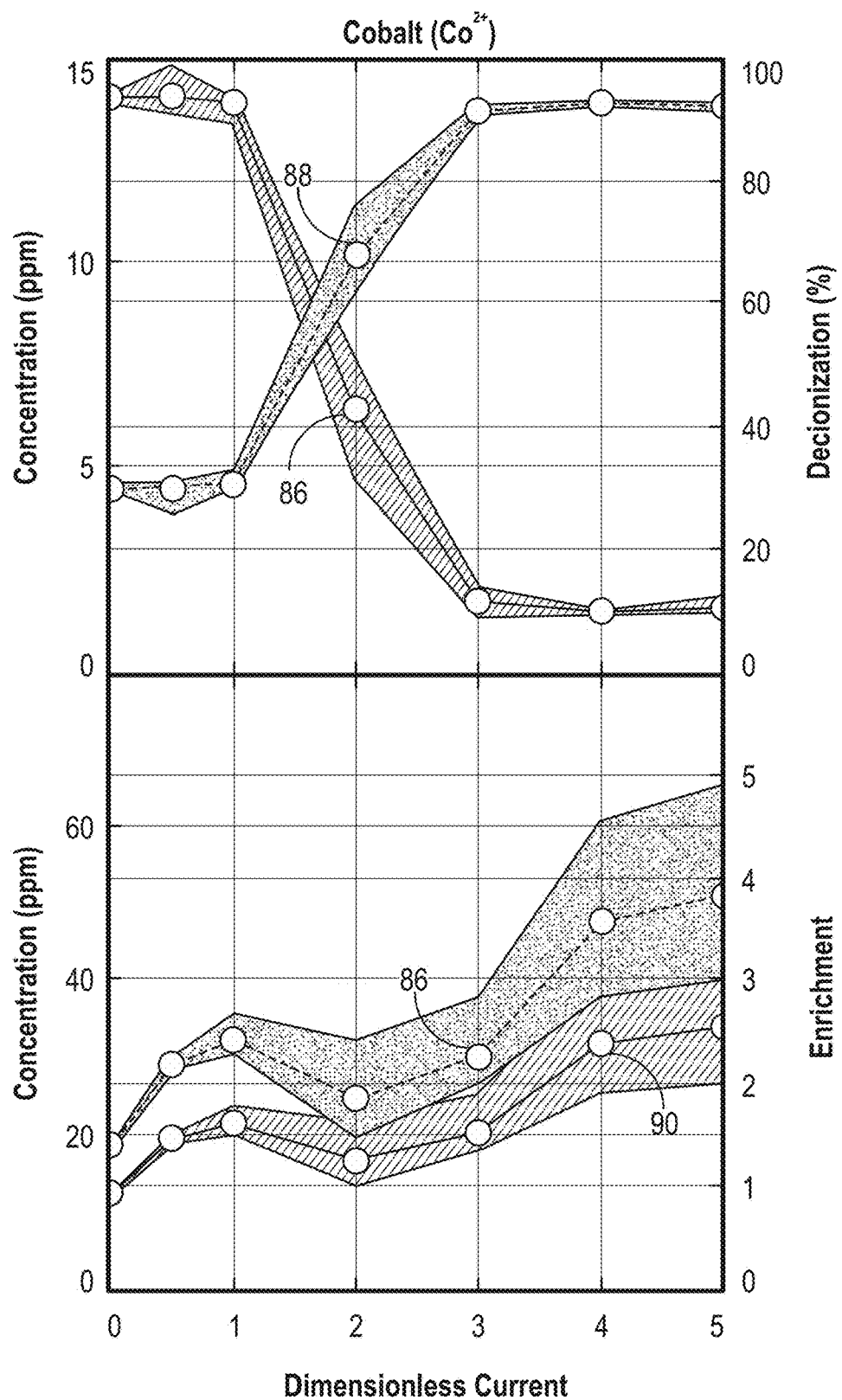
Figure 9:
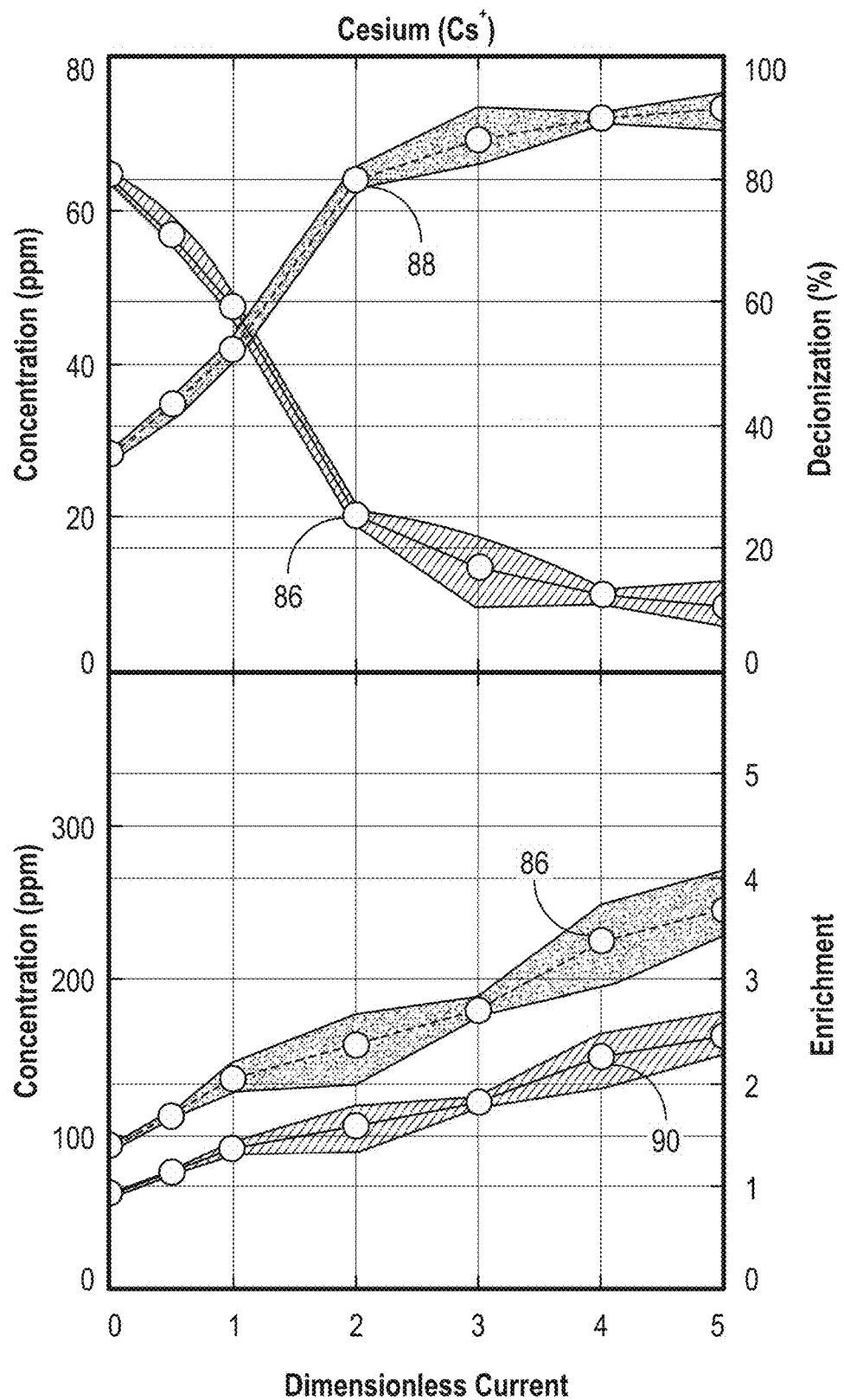

Based on a previous study by our group, we operated our SED system in galvanostatic mode because it facilitates the formation of a stable deionization shock wave when supplying overlimiting current. Potentiostatic operation, on the other hand, tends to result in overshoot and oscillation about a desired overlimiting current and is associated with variability in the shock wave. In the results for treatment of practical water, as presented in FIGS. 7-9, deionization 88 (the percentage removed of a given species, DI) is defined as follows:

$$DI = 100\% \times \left(1 - \frac{C_{fresh}}{C_{feed}}\right), \quad (5)$$

where enrichment factor 88 (EF) is defined as follows:

$$EF = \frac{C_{brine}}{C_{feed}}, \quad (6)$$

and where dimensionless current ($\tilde{I}$) is defined as $\tilde{I}=I/I_{lim}$. The upper half of FIGS. 7-9 illustrates that the concentration of cations [Li$^+$ (FIG. 7), Co$^{2+}$ (FIG. 8), and Cs$^+$ (FIG. 9)] in the fresh stream 72 decreased—by up to 92% for both Co$^{2+}$, and Cs$^+$—with current. Moreover, the lower half shows that the concentration of cations in the brine stream 74 increased with current. Deionization that occurred with no applied current was most likely due to exchange of H$^+$ (abundant in the cathode) with cations in practical water across the lower membrane 16.

Figure 10:
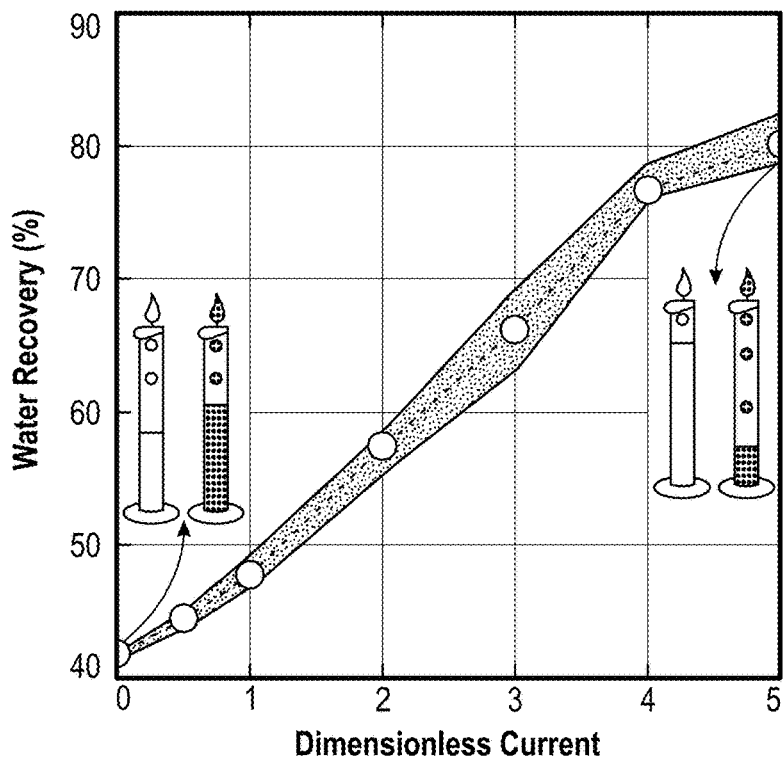
FIGS. 10-12 provide quantitative analysis of the water recovery and energy demand/cost corresponding to the results shown in FIG. 7.
Figure 11:
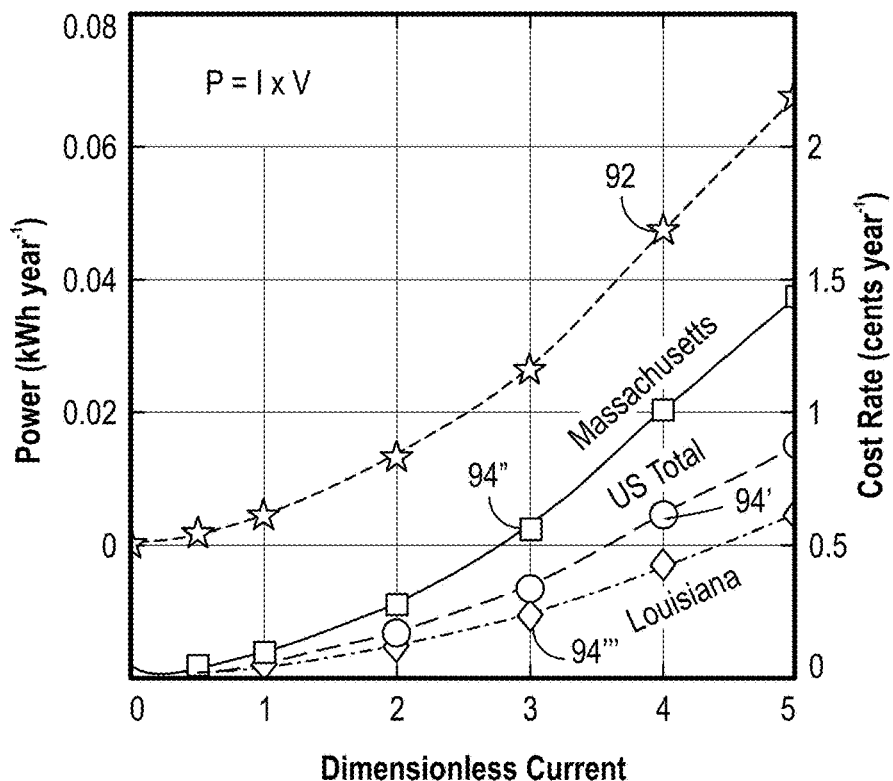
Figure 12:
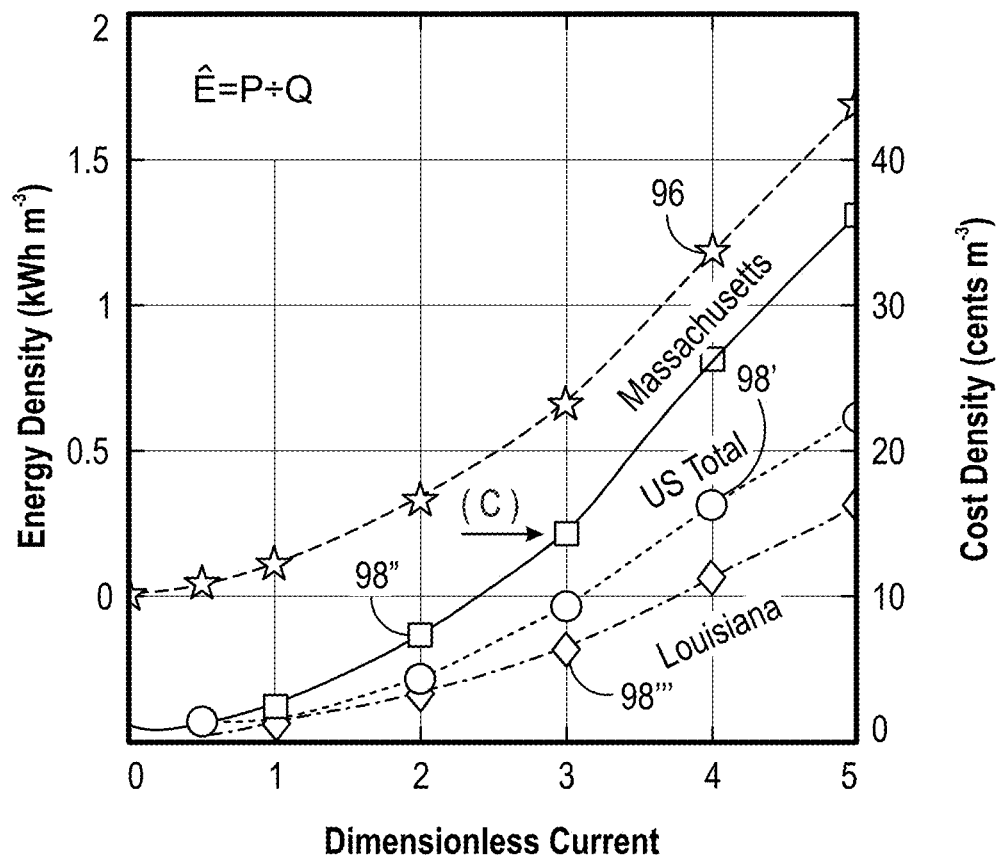

FIGS. 10-12 provides a quantitative analysis of the water recovery and energy demand/cost corresponding to the results shown in FIGS. 7-9. FIG. 10 plots water recovery as a function of dimensionless current; graduated cylinders portray relative proportions of the fresh and brine products, and each data point represents the arithmetic mean of four samples with the shaded area corresponding to the range of those samples. FIG. 11 plots power 92 and cost rate 94, while FIG. 12 plots energy density 96 and cost density 98 as functions of dimensionless current. Cost rate 94 (cost density 96) is equal to power 92 multiplied by the residential cost of electricity, which varies between states in the US. Meanwhile. Cost density 96 is equal to energy density 96 multiplied by the residential cost of electricity. The cost rates/densities for US 94'/98' (total) and for Massachusetts 94"/98" and Louisiana 94'''/98''' are plotted for comparison.

Given the importance of water recovery and energy efficiency in desalination systems, we analyzed the recovery ability and energy demand of SED when used to treat practical water. Water recovery (WR), sometimes referred to as the recovery ratio, is defined as follows:

$$WR = \frac{Q_F}{Q'}, \quad (7)$$

where $Q_F$ is the volumetric flow rate of the fresh stream; and it is shown in FIG. 11 to increase (up to 80%) with current. This increase in water recovery is predominantly due to electroosmotic flow [see above discussion and the Supporting Information in S. Schlumpberger, et al., "Scalable and continuous water deionization by shock electrodialysis," 2 Environmental Science & Technology Letters 367-372 (2015)]. The position of the splitter was not changed in this study, although it could be adjusted in future designs for improved water recovery. Analysis of the electrical energy needed for deionization is shown in FIGS. 11 and 12, where power 92, P, is the product of applied current and (steady) voltage, and energy density 96, Ê, is power 92 divided by the volumetric flow rate of the feed. Although electrical power 92 is the more natural measure of energy transport, it is extensive and does not scale with the size of a system (particularly with flow rate). Energy density 96 is, therefore, of greater value in quantifying the energy efficiency of SED. In treating practical water, the energy density 96 increases quadratically with current, though it was on the order of 1 kWhm$^{-3}$ for dimensionless currents between 3 and 5. Moreover, the cost of fluidic pumping in our laboratory scale system was negligible compared to the cost of electrical energy:

$$P_{pump}=N[Q'\Delta p_{frit}+Q(\Delta p_{anolyte}+\Delta p_{catholyte})]=2.0\times10^{-3} \text{ kWh year}^{-1},$$

$$\hat{E}_{pump}=N[\hat{E}_{frit}+\hat{E}_{anolyte}+\hat{E}_{catholyte}]=4.2\times10^{-2} \text{ kWh}^{-3} \quad (8)$$

where N is the number of passes (three here), Δp is pressure drop [6.1 pounds per square inch (psi) across the frit and 0.67 psi across each of the electrodes], and Q=0.21 mLmin$^{-1}$ is the volumetric flow rate of the electrode streams. At commercial scales, however, we expect that the cost of pumping will become important and will increase according to the desired level of throughput.

A more intuitive way of understanding the energy efficiency of SED is to consider cost rate 94 (FIG. 11) or cost density 98 (FIG. 12), which can be equated with power 92 or energy density 96, respectively, multiplied by the cost of residential electricity per kilowatt hour. We present average electricity data for a state in which electricity is expensive (MA 94"/98", \$0.21 kWh-1) and in the other cheap (LA 94'''/98''', \$0.09 kWh-1) relative to the US total 94'/98' (\$0.13 kWh-1); costs are based on 2018 data gathered from the US Energy Information Administration (EIA). The cost (\$81,800) for applying three times the dimensionless current (enough to remove 82% of Li$^+$, 91% of Co$^{2+}$, and 85% of Cs$^+$) to a body of water with a volume (576,000 m$^3$) equal to that of the Prudential Tower in Boston, MA The cost density 98 (CD) from FIG. 12 is 14.2 cents per m$^3$. For comparison, a nuclear reactor with an electrical power output of 1.7 GWe, such as the US Advanced Pressurized Water Reactor, requires coolant at a flow rate of approximately 28 m$^3$ s$^{-1}$. This flow rate corresponds to 8.8×108 m$^3$ (>1,500 times the volume of the Prudential Tower) of water that passes through the reactor core annually. The simple economic analysis introduced here will be useful when SED is being scaled up for use at commercial scale.

For common desalination technologies, performance is improved and energy consumption is reduced by using multiple units or stages of the technology in series, and by operating each stage at lower power. Such an approach is especially suitable for SED because power 92 increases quadratically with current (FIG. 11), even though deionization 88 eventually plateaus (FIGS. 7-9). To test this hypothesis, we developed a new configuration for our system that involved a three-step process for deionization of practical water. Because the throughput of our laboratory-scale device was low, we accelerated experimentation with this process by feeding serially diluted solutions, in turn, to the same device. A dilution factor of 5 was chosen for the second step and 25 for the third based on deionization of the target species in the first two steps for a dimensionless current of 5. In other words, concentrations of the feed to each pass were 1.41 mM ($I_{lim}$=180 μA), 0.282 mM (5× dilution, $I_{lim}$=36 μA), and 0.0564 mM (25× dilution, $I_{lim}$=7.2 μA), respectively, neglecting boric acid.

Figure 13:
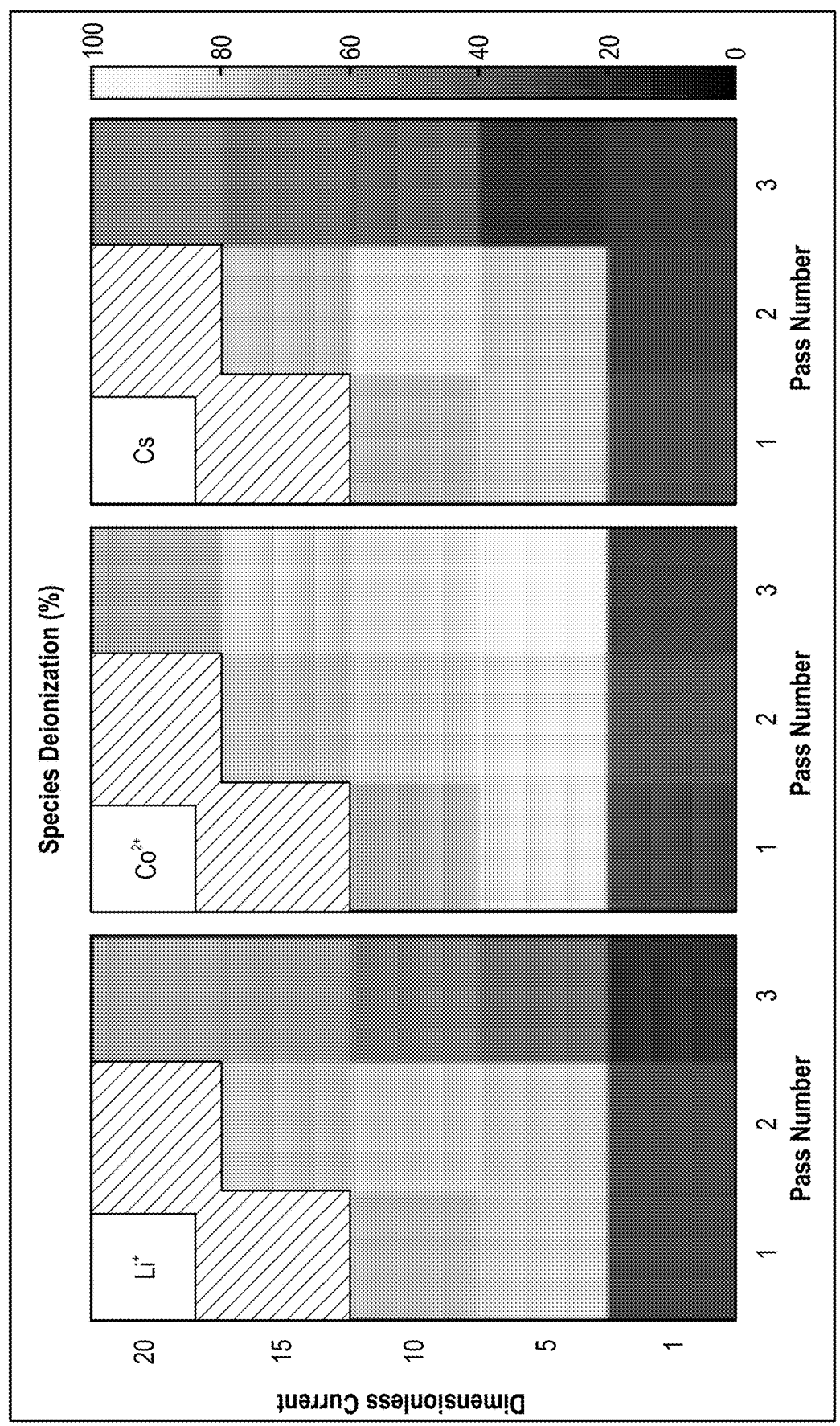
FIGS. 13-15 include plots for a simulation of a three-step process for deionization of practical water by feeding serially diluted solutions in turn to the same device.
Figure 14:
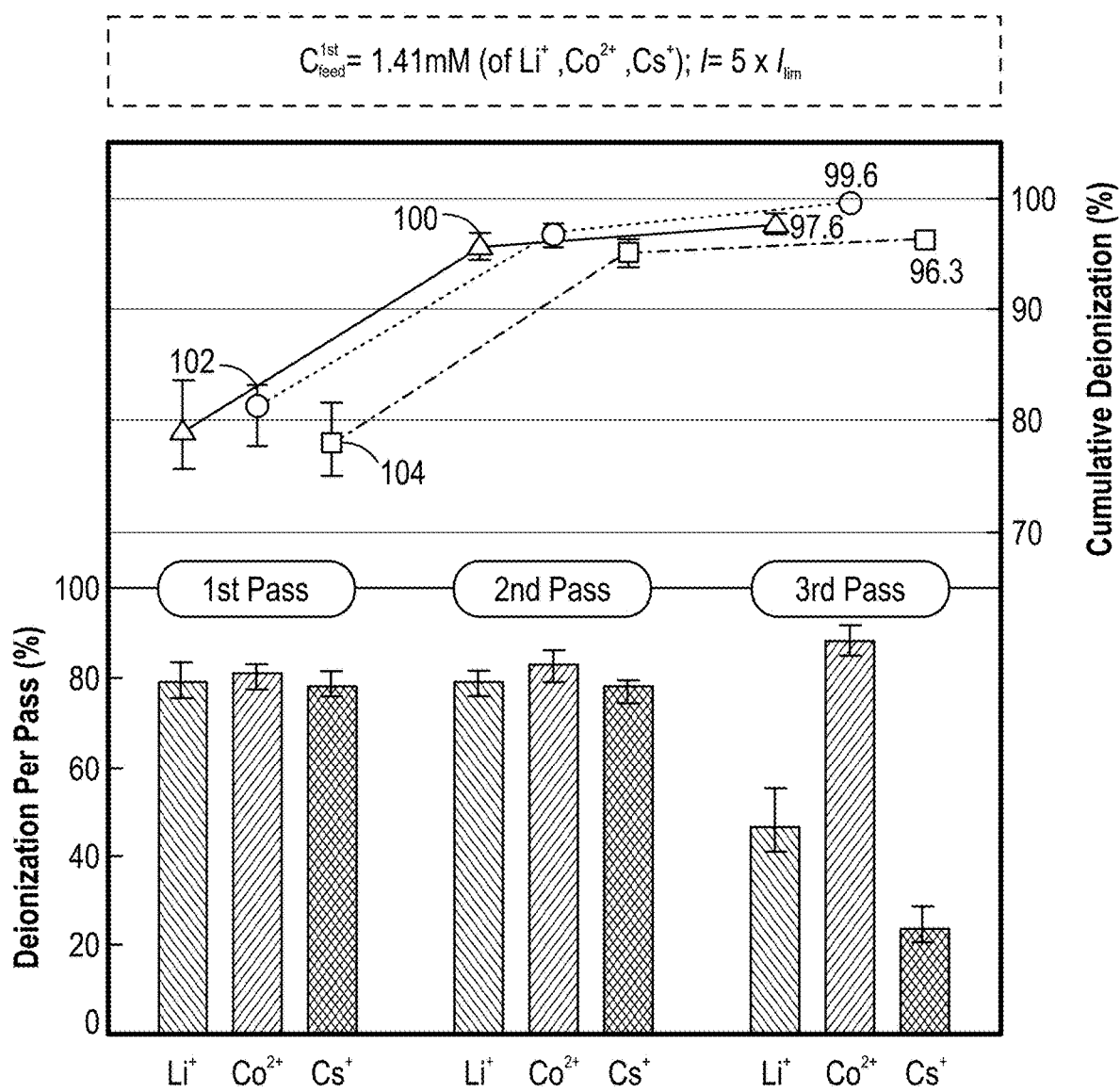
Figure 15:
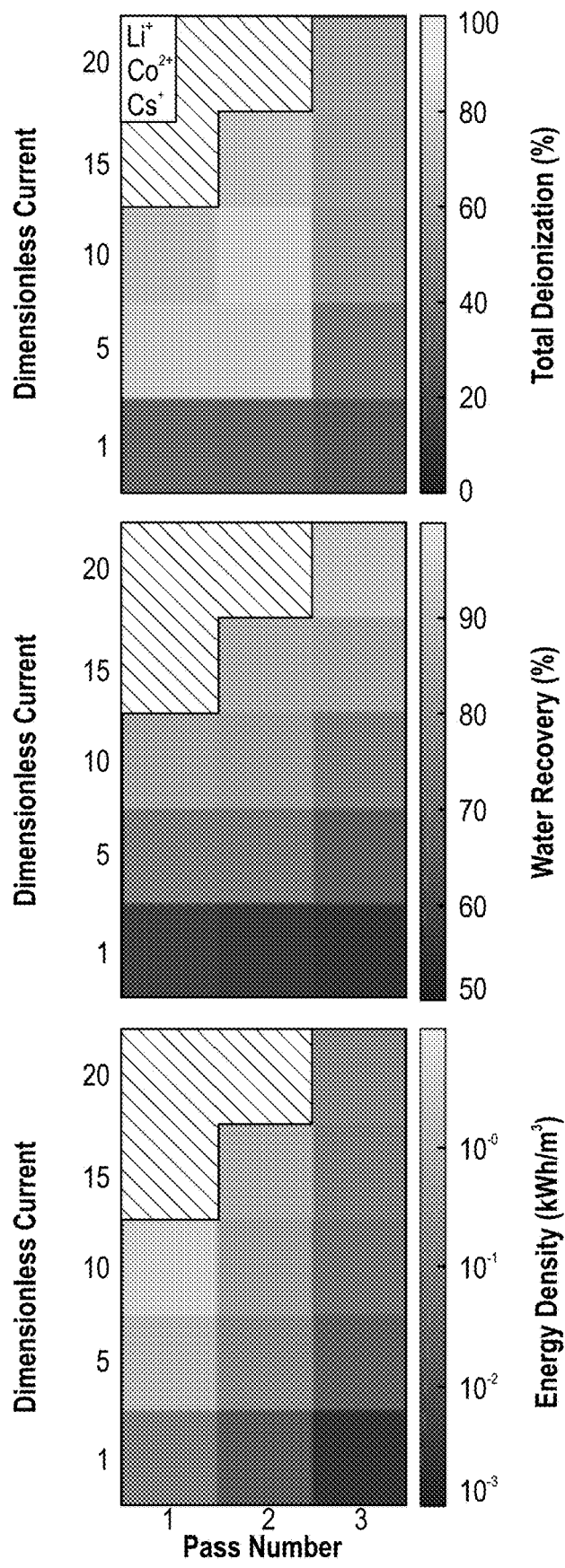

FIG. 13 presents two-dimensional arrays of deionization for each species as a function of dimensionless current in each pass in a simulation of the three-step process for deionization of practical water by feeding serially diluted solutions, in turn, to the same device. In these experiments, dimensionless current ranged from 1 to 20, though deionization typically plateaued at some moderate value. To examine the performance of our system at one such value, we report deionization per pass (bottom) and cumulative deionization (top) for each species (Li$^+$ 100, Co$^{2+}$ 102, Cs$^+$ 104) at a dimensionless current of 5, as shown in FIG. 14. Each data point represents the arithmetic mean of three samples with errors bars corresponding to the range of those samples. In the first and second passes, all three species were removed in nearly equal proportions, whereas in the third pass, $Co^{2+}$ 102 was preferentially removed. This selective separation of the divalent ion agreed with a previous experimental study by our group, in which magnesium was selectively removed from an aqueous mixture of NaCl and $MgCl_2$. FIG. 14 also shows that our three-step process led to a high cumulative deionization for each species, ranging from 96.3% for $Cs^+$ 104 to 99.6% for $Co^{2+}$ 102. Based on its ability to remove target ions from practical water, SED could function as a novel method for treatment of radioactive waste. Presented in FIG. 15 are two-dimensional arrays of total deionization (top) for the three target species, water recovery (middle), and energy density (bottom) as functions of dimensionless current in each pass. Zones of diagonal black stripes in FIGS. 13 and 15 correspond to parameters that were not tested.

In addition to removal of target ions, effective methods for decontamination of water also optimize total deionization, water recovery, and energy density. These quantities are shown for our three-step process in FIG. 15 and are consistent with previously observed trends—total deionization often plateaus at some moderate value of dimensionless current, whereas water recovery and energy density increase monotonically with current. It is striking to learn that this device can sustain water recovery at over 92% ($\tilde{I}=20$) only by electroosmotic flow and even though the splitter is positioned midway along the width of the frit. Moreover, successive steps in this process contribute little energy in addition to that consumed in the first step, which implies that a contaminated feed can be repeatedly passed through the device for greater deionization at a reduced cost. This proportionality between energy demand and concentration of the feed—even in the dilute limit—gives SED an advantage over conventional purification techniques, which typically require an input of energy that is bounded from below as the feed becomes more dilute. As with other desalination methods, removal of more ions by multi-step SED comes at the expense of water recovery, which diminishes in every pass. We will address this challenge in future generations of our device by introducing a recycle scheme that feeds the brine stream from a later pass back to an earlier pass in which the original feed is of comparable concentration.

Thus far, we quantified the ability of SED to remove target species from practical water and identified general rules to optimize the design of a real system that can treat nuclear waste. In particular, we inferred a complex coupling between the extent of deionization—convoluted by the selective nature of separation by SED—water recovery, and energy demand. The relationship between these parameters is nonlinear, and indeed we observe quadratic growth in energy density with applied current (FIGS. 11 & 12 and FIG. 15). Moreover, deionization varies between species and is not monotonic, and water recovery appears to increase sublinearly with applied current (FIG. 10 and FIG. 15). These results suggest that there is an inherent tradeoff between deionization, water recovery, and energy efficiency, which poses a significant challenge to satisfactorily treat nuclear waste while minimizing the demand for power. We addressed this challenge from the perspective of systems engineering by introducing a new figure of merit (Ψ) defined as follows:

$$\psi = DI^2 \times WR^n \times f(\hat{E}), \quad (9)$$

where DI is deionization (squared to emphasize this metric), WR is water recovery, n is a positive integer (either 1 or 2 here), and $f(\hat{E})$ is a dimensionless function of energy density that ranges from 0 to 1. This function may be constant:

$$f(\hat{E})=1 \text{ (no penalty on energy demand)}, \quad (10)$$

linear:

$$f(\hat{E}) = E_{lin} \equiv 1 - \frac{\hat{E}}{\max \hat{E}}, \quad (11)$$

or nonlinear with respect to $\hat{E}$:

$$f(\hat{E}) = E_{quad} \equiv \sqrt{\frac{1 - \hat{E}/\max\hat{E}}{1 - \min\hat{E}/\max\hat{E}}}, \quad (12)$$

where "min" and "max" operate on the entire array of energy densities in FIG. 15. Although we only considered Eq. 4 and Eq. 5 in this study, a nonlinear function, such as Eq. 6, could be used to detract from the merit of steps that operate at high power, such that this penalty would become increasingly severe as $\hat{E}$ approaches max $\hat{E}$. In any case, all terms in the expression for Ψ (and hence Ψ, itself) would range from 0 to 1.

Introducing a figure of merit allows us to quantitatively decide which operating conditions in each pass maximize deionization in our system. Characterization of the performance of our three-step process is shown in FIGS. 16-18 based on several variations of Ψ. For example, Ψ may be based on deionization of cobalt only (FIG. 16) or total deionization (FIG. 17). These variations of Ψ, both with n=1, suggest the same value of dimensionless current in only the first pass ($\tilde{I}=5$) but suggest different values in the second and third passes (as designated by the colored stars). This difference can be rationalized by the fact that deionization of $Co^{2+}$ 102 (and not of $Li^+$ 100 or $Cs^+$ 104) is often greatest at low to moderate dimensionless current (FIG. 13).

To select the most suitable operating conditions, we compared total (and individual) deionization, water recovery, and energy density, all of which are summarized in Table 2, below, for the sequence of passes that maximizes the corresponding variation of Ψ. The sequence that maximizes $\Psi_{Co}$ in each step, for instance, leads to relatively low water recovery; but the energy density it consumes is also the least. In comparison, the sequence that maximizes $\Psi_{tot}$ in each step gives water recovery of 58%; and it maintains almost 99% deionization of $Co^{2+}$ with little additional demand for energy. This level of water recovery is similar to those achieved by conventional purification technologies, though it can be increased by selecting an alternate sequence in our process. To make a quantitatively motivated selection, more weight is given to water recovery by setting n=2 and $f(\hat{E})=1$ in our definition of Ψ, as shown in FIG. 18. With this modification, the sequence that maximizes $\Psi_{WR}$ in each step gives a water recovery of 66%. In response, however, consumption of energy increases considerably. It then seems that water recovery can be improved in return for higher energy consumption (or lower deionization, by repositioning the splitter) depending on the targets set by the operator.

In Table 2, below, a summary is provided of total (and individual) deionization, DI; water recovery, WR; and energy density, $\hat{E}$, for the sequence of passes that maximizes the figure of merit, Ψ, in FIGS. 16-18 (designated by the stars). For all cases reported in Table 2, total deionization is approximately 98%, and deionization of $Co^{2+}$ is even greater in our three-step process. Another practical result is the high deionization of $Li^+$, which is used (as LiOH) in nuclear reactors for corrosion control by alkalizing the process water. For this application, LiOH is isotopically enriched in lithium-7, which does not interfere with nuclear reactions (unlike lithium-6); and it is sometimes used in demineralizers (also known as ion exchangers) to remove radioactive contaminants from the process water. Lithium can be selectively captured and recycled in our system (or reused elsewhere) by integrating capacitive deionization (CDI) with intercalation materials as a second operation following SED.

TABLE 2

|  | $DI_{tot}$ (%) | $DI_{Li}$ (%) | $DI_{Co}$ (%) | $DI_{Cs}$ (%) | WR (%) | $\hat{E}$ (kWhm$^{-3}$) |
|---|---|---|---|---|---|---|
| Optimal Sequence for $\Psi_{Co}$ | 98.1 ± 0.2 | 98.0 ± 0.2 | 99.5 ± 0.1 | 97.3 ± 0.5 | 43 ± 2 | 1.76 ± 0.04 |
| Optimal Sequence for $\Psi_{tot}$ | 98.6 ± 0.1 | 98.8 ± 0.2 | 98.9 ± 0.3 | 98.3 ± 0.2 | 58 ± 2 | 2.18 ± 0.05 |
| Optimal Sequence for $\Psi_{WR}$ | 98.2 ± 0.2 | 98.5 ± 0.3 | 98.3 ± 0.4 | 98.1 ± 0.2 | 66 ± 2 | 4.8 ± 0.2 |

This process intensification of SED can, in principle, be achieved in two steps by using CDI to recycle Li$^+$ in two steps, as illustrated in FIG. 19. In the first step, an SED device 10 is used to concentrate waste into the brine stream 74, from which Li$^+$ is selectively captured in the CDI unit 106 (from the brine stream 74 discharged by SED device 10) by intercalation into an appropriate (first) electrode 108, such as iron phosphate [Fe(III)PO$_4$, often prepared by deintercalation of Li$^+$ from an electrode formed of LiFe(II)PO$_4$ or lithium manganese oxide (LiMn$_2$O$_4$)]. The brine stream 74 flows between ion-selective boundaries in the form of separators (e.g., in the form of filter paper, stainless-steel fibers, metallic meshes, or carbon-nanotube sheets) or membranes 16 that separate the brine stream from the first electrode 108 and a porous electrode 110 formed of carbon (in other exemplifications, this electrode can be formed of an advanced electrode material, such as intercalation electrodes and redox active polymer electrodes, which are essentially carbon nanotube electrodes functionalized with conducting polymers) on the opposite side, wherein the anions (denoted as A$^-$) and lithium ion (referenced as Li$^+$) respectively pass through the two membranes, as shown. Where an iron phosphate electrode is used for the first electrode 108, it becomes lithium iron phosphate (Li$_x$FePO$_4$) upon insertion of Li$^+$. During this process, all cations are driven towards the first electrode 108, but only Li$^+$ can be inserted into its crystal lattice because Cs$^+$ is too large, and Co$^{2+}$ will exhibit strong Coulomb repulsion (vacancies in FePO$_4$ are fitted for small monovalent cations). Moreover, the anions (A$^-$) are inserted into a porous carbon electrode 110 where they are electrostatically trapped by the applied potential. Fluid leaving the CDI unit 106 in this first step will, therefore, be depleted of lithium and its counterion(s).

In the second step, the fresh water stream 72 produced by SED is passed through the CDI unit 106. By reversing the direction of electric field (by reversing the respective voltages applied to the electrodes 108 and 110), lithium and its counterion(s) are released from the first electrode 108 back into solution and are recovered for later use.

Although methods and systems designed to target removal of cations are a focus of the above discussion, adapted versions of these methods and systems can alternatively be employed to remove anions. To remove anions, the charges of the components in the SED chamber would be switched. For example, the cation exchange membranes (or alternative form of cation separator) would be replaced with anion exchange membranes (or alternative form of anion separator); and the cationic porous medium would be replaced with an anionic porous medium. Such anion-targeted applications can include radionuclide separations that involve target anions, including complexes of cations with over-compensating anions. Further discussion of the use of SED for the removal of anions can be found in U.S. Pat. Nos. 8,801,910 B2 and 8,999,132 B2, which are incorporated herein by reference.

In describing embodiments, herein, specific terminology is used for the sake of clarity. For the purpose of description, specific terms are intended to at least include technical and functional equivalents that operate in a similar manner to accomplish a similar result. Additionally, in some instances where a particular embodiment includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Further still, where methods are recited and where steps/stages are recited in a particular order—with or without sequenced prefacing characters added for ease of reference—the steps/stages are not to be interpreted as being temporally limited to the order in which they are recited unless otherwise specified or implied by the terms and phrasing.

This invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention.

What is claimed is:

1. A system for separating radioactive nuclides, the system comprising:
   a source of an aqueous radioactive liquid including radioactive nuclides, including cobalt (2+) ions and monovalent cations, wherein the aqueous radioactive liquid has a total salt concentration of less than 0.1 mM;
   a feed conduit for liquid flow from the source of aqueous radioactive liquid;
   a shock electrodialysis device configured to receive the aqueous radioactive liquid from the feed conduit and including:
      a chamber including:
         respective inlets for:
            the aqueous radioactive liquid, wherein the inlet for the radioactive liquid is in fluid communication with the feed conduit from the source;
            an anolyte; and
            a catholyte; and
         respective outlets for:
            purified water;
            a brine that includes the radioactive nuclides;
            the anolyte; and
            the catholyte;
      a porous anode contained in the chamber and configured for flow of the anolyte therethrough;
      a porous cathode contained in the chamber and configured for flow of the catholyte therethrough;
      at least two of the following functioning as ion separators:
         an ion-selective boundary;
         the anode being configured for ion separation; and
         the cathode being configured for ion separation,
      wherein the ion separators are configured to selectively pass at least some cations, wherein a channel for flow of the aqueous radioactive liquid from the feed conduit is defined between the ion separators, and wherein the anode and the cathode are configured to drive ionic current in the aqueous radioactive liquid across the channel when the aqueous radioactive liquid fills the channel, and wherein the ion separator is configured to conduct the ionic current; and
      a cationic porous medium between the ion-selective boundaries in the channel, wherein the cationic porous medium has a positive surface charge to promote flow of the ionic current across the channel and production of a desalination shock with a region of purified water on one side of the desalination shock and a brine that includes the radioactive nuclides from the aqueous radioactive liquid on an opposite side of the desalination shock and to selectively concentrate the cobalt (2+) ions over monovalent cations in the brine.

2. The system of claim 1, further comprising a splitter positioned to separate (a) flow of the purified water to the outlet for the purified water and (b) flow of the brine to the outlet for the brine.

3. The system of claim 1, wherein the source of the radioactive aqueous liquid is a nuclear reactor.

4. The system of claim 1, wherein the radioactive aqueous liquid comprises cobalt and cesium.

5. The system of claim 1, wherein the radioactive aqueous liquid further comprises boric acid and lithium.

6. The system of claim 1, wherein the ion separators comprise a pair of the ion-selective boundaries.

7. The system of claim 6, wherein the ion separators are ion-selective cation exchange membranes.

8. The system of claim 1, further comprising a voltage source electrically coupled with the anode and the cathode.

9. The system of claim 1, further comprising:
   a first capacitive deionization unit with an inlet configured to receive the brine from the shock electrodialysis device;
   a second capacitive deionization unit with an inlet configured to receive the purified water from the shock electrodialysis device.

10. The system of claim 9, wherein each capacitive deionization unit comprises:
    a first electrode capable of intercalating and deintercalating $Li+$ ions;
    a porous second electrode;
    a pair of membranes between the first electrode and the porous second electrode, wherein a channel for fluid flow is defined between the membranes.

11. A method for separating radioactive nuclides, comprising:
    using the system for separating radioactive nuclides of claim 1;
    feeding the aqueous radioactive liquid including radioactive nuclides into the chamber between the porous anode and the porous cathode of the shock electrodialysis device;
    feeding the anolyte through the porous anode;
    feeding the catholyte through the porous cathode;
    applying a voltage to the porous anode and to the porous cathode to create a voltage differential across the chamber;
    passing the aqueous radioactive liquid through the chamber and selectively driving cations from the aqueous radioactive liquid into the porous cathode via the creation of the voltage differential;
    creating the desalination shock in the aqueous radioactive liquid via the creation of the voltage differential, the desalination shock producing an ion-enriched zone on one side of the desalination shock and a deionized zone on an opposite side of the desalination shock and selectively concentrating the cobalt (2+) ions over the monovalent cations in the brine;
    extracting a brine including the radioactive cations from the ion-enriched zone through a brine outlet; and
    extracting purified water from the deionized zone through a purified-water outlet.

12. The method of claim 11, further comprising generating the aqueous radioactive liquid in a nuclear reactor.

13. The method of claim 11, wherein a pair of ion-selective boundaries are positioned between the porous anode and the porous cathode and define the chamber therebetween.

14. The method of claim 13, wherein the ion-selective boundaries are ion-selective cationic membranes.

15. The method of claim 11, further comprising:
    passing the brine through a first capacitive deionization unit; and
    passing the purified water through a second capacitive deionization unit.

16. The method of claim 15, further comprising:
    applying a voltage to a first electrode in the first capacitive deionization unit to intercalate lithium ions from the brine into the first electrode;

applying a voltage to a porous second electrode in the first capacitive deionization unit to extract anions from the brine into the porous second electrode;

applying a voltage to a first electrode in the second capacitive deionization unit to deintercalate lithium ions from the first electrode into the purified water; and applying a voltage to a porous second electrode in the second capacitive deionization unit to extract anions from the porous second electrode into the purified water.

17. The system for separating radioactive nuclides of claim 1, wherein the aqueous radioactive liquid is a serially diluted solution.

\* \* \* \* \*